United States Patent [19]
Ghosh et al.

[11] Patent Number: 5,463,759
[45] Date of Patent: Oct. 31, 1995

[54] ADAPTIVE WRITE-BACK METHOD AND APPARATUS WHEREIN THE CACHE SYSTEM OPERATES IN A COMBINATION OF WRITE-BACK AND WRITE-THROUGH MODES FOR A CACHE-BASED MICROPROCESSOR SYSTEM

[75] Inventors: Subir K. Ghosh, San Jose; Dipankar Bhattacharya, Santa Clara, both of Calif.

[73] Assignee: OPTi, Inc., Santa Clara, Calif.

[21] Appl. No.: 419,736

[22] Filed: Apr. 10, 1995

Related U.S. Application Data

[60] Division of Ser. No. 889,740, May 28, 1992, which is a continuation-in-part of Ser. No. 878,730, May 4, 1992, Pat. No. 5,287,481, which is a continuation-in-part of Ser. No. 812,074, Dec. 19, 1991, Pat. No. 5,414,827.

[51] Int. Cl.$^6$ .......................... G06F 12/00; G06F 12/12; G06F 13/00
[52] U.S. Cl. .......................... 395/461; 395/469; 395/470; 395/432; 364/243.41; 364/254.3; 364/DIG. 1; 364/957.1; 364/964.341; 364/964.342; 364/DIG. 2

[58] Field of Search ........................... 395/425, 461, 395/469, 470; 364/243.41, 254.3, 957.1, 964.341, 964.342

[56] References Cited

U.S. PATENT DOCUMENTS

| | | | |
|---|---|---|---|
| 5,301,299 | 4/1994 | Pawlowski et al. | 395/425 |
| 5,303,364 | 4/1994 | Mayer et al. | 395/425 |
| 5,418,927 | 5/1995 | Chang et al. | 395/425 |

*Primary Examiner*—Tod R. Swann
*Assistant Examiner*—Frank J. Asta
*Attorney, Agent, or Firm*—Fliesler, Dubb, Meyer & Lovejoy

[57] ABSTRACT

Method and apparatus for reducing the access time required to write to memory and read from memory in a computer system having a cache-based memory. A dynamic determination is made on a cycle by cycle basis of whether data should be written to the cache with a dirty bit asserted, or the data should be written to both the cache and main memory. The write-through method is chosen where the write-through method is approximately as fast as the write-back method. Where the write-back method is substantially faster than the write-through method, the write-back method is chosen.

11 Claims, 9 Drawing Sheets

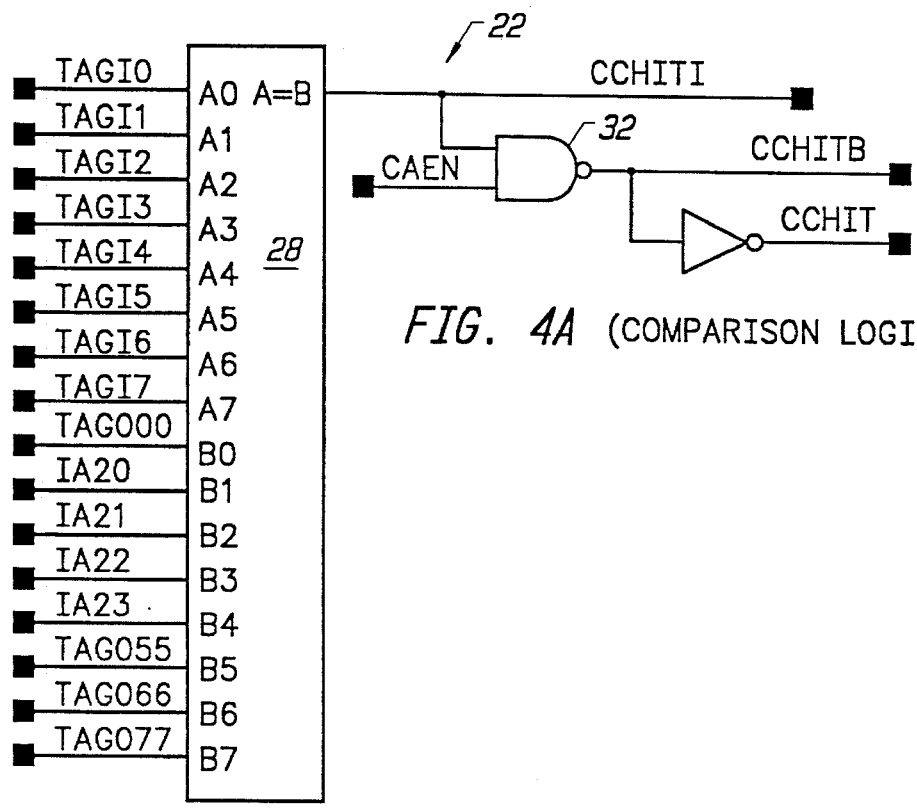
FIG. 4A (COMPARISON LOGIC A)
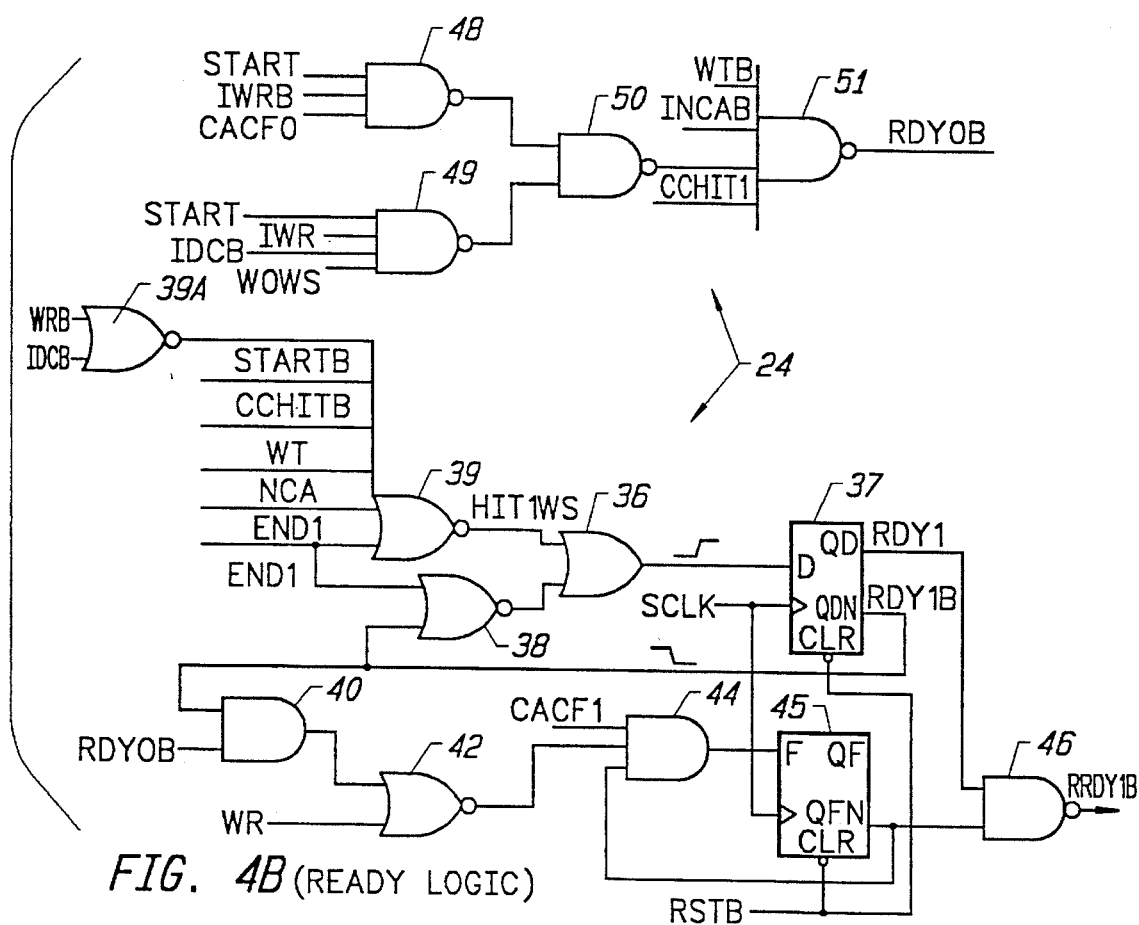
FIG. 4B (READY LOGIC)

ADAPTIVE WRITE-BACK METHOD AND APPARATUS WHEREIN THE CACHE SYSTEM OPERATES IN A COMBINATION OF WRITE-BACK AND WRITE-THROUGH MODES FOR A CACHE-BASED MICROPROCESSOR SYSTEM

CROSS-REFERENCE TO RELATED APPLICATIONS

This application is a DIVISIONAL of Ser. No. 07/889,740, filed May 28, 1992, which is a continuation-in-part (CIP) of the "parent" which is turn, is a CIP of the "grandparent" U.S. patent application Ser. No. 07/812,074, filed on Dec. 19, 1991, now U.S. Pat. No. 5,414,827 by inventor David Lin, and entitled "Automatic Cache Flush." Both the "parent" and the "grandparent" application of the present application are assigned to the assignee of the present application and are hereby incorporated by reference.

BACKGROUND

1. Field of the Invention

The invention relates generally to data storage and retrieval procedures in microprocessor-based systems, and more particularly, to improvements in cache memory management which is commonly utilized in such systems.

2. Description of Related Art

Cache memories are high-speed memories that are positioned between microprocessors and main memories in a computer system in order to improve system performance. Cache memories (or caches) store copies of portions of main memory that are actively being used by the central processing unit (CPU) while a program is running. Since the access time of a cache can be faster than that of main memory, the overall access time can be reduced.

Use of small, high speed caches in computer designs permits the use of relatively slow but inexpensive Dynamic Random Access Memories (DRAMs) for the large main memory space, by taking advantage of the "property of temporal locality," i.e., the property inherent in most computer programs wherein a memory location referenced at one point in time is very likely to be referenced again soon thereafter. Descriptions of the various uses of and methods of employing caches appear in the following articles: Kaplan, "Cache-based Computer Systems," *Computer,* 3/73 at 30–36; Rhodes, "Caches Keep Main Memories From Slowing Down Fast CPUs," *Electronic Design,* Jan. 21, 1982, at 179; Strecker, "Cache Memories for PDP-11 Family Computers," in Bell, *"Computer Engineering"* (Digital Press), at 263–67, all incorporated herein by reference. See also the description at pp. 6-1 through 6-11 of the "i486 Processor Hardware Reference Manual" mentioned above.

Many microprocessor-based systems implement a "direct mapped" cache memory to improve performance. In general, a direct mapped cache memory comprises a high speed data Random Access Memory (RAM) and a parallel high speed tag RAM. The RAM address of each line in the data cache is the same as the low-order portion of the main memory line address to which the entry corresponds, the high-order portion of the main memory address being stored in the tag RAM. Thus, if main memory is thought of as $2^m$ blocks of $2^n$ "lines" of one or more bytes each, the i'th line in the cache data RAM will be a copy of the i'th line of one of the $2^m$ blocks in main memory. The identity of the main memory block that the line came from is stored in the i'th location in the tag RAM. Tag RAM also typically contains a "valid" bit corresponding to each entry, indicating whether the tag and data in that entry are valid.

When a CPU requests data from memory, the low-order portion of the line address is supplied as an address to both the cache data and cache tag RAMs. The tag for the selected cache entry is compared with the high-order portion of the CPU's address and, if it matches, then a "cache hit" is indicated and the data from the cache data RAM is enabled onto a data bus of the system. If the tag does not match the high-order portion of the CPU's address, or the tag data is invalid, then a "cache miss" is indicated and the data is fetched from main memory. It is also placed in the cache for potential future use, overwriting the previous entry. Typically, an entire line is read from main memory and placed in the cache on a cache miss, even if only a byte is requested. On a data write from the CPU, either the cache RAM or main memory or both may be updated, it being understood that flags may be necessary to indicate to one that a write has occurred in the other.

Accordingly, in a direct mapped cache, each "line" of secondary memory can be mapped to one and only one line in the cache. In a "fully associative" cache, a particular line of secondary memory may be mapped to any of the lines in the cache; in this case, in a cacheable access, all of the tags must be compared to the address in order to determine whether a cache hit or miss has occurred. "k-way set associative" cache architectures also exist which represent a compromise between direct mapped caches and fully associative caches. In a k-way set associative cache architecture, each line of secondary memory may be mapped to any of k lines in the cache. In this case, k tags must be compared to the address during a cacheable secondary memory access in order to determine whether a cache hit or miss has occurred. Caches may also be "sector buffered" or "sub-block" type caches, in which several cache data lines, each with its own valid bit, correspond to a single cache tag RAM entry.

When the CPU executes instructions that modify the contents of the cache, these modifications must also be made in the main memory or the data in main memory will become "stale." There are two conventional techniques for keeping the contents of the main memory consistent with that of the cache—(1) the write-through method and (2) the write-back or copy-back method.

In the write-through method, on a cache write hit, data is written to the main memory immediately after or while data is written into the cache. This enables the contents of the main memory always to be valid and consistent with that of the cache. An advantage of the write-through method is that any line of data in the cache can later be overwritten, for example, on a read from another location in main memory that maps to the same line of cache, without data loss. The write-through method has a disadvantage of increasing secondary memory write traffic on the CPU bus because every write cycle requires the use of secondary memory.

In the write-back method, on a cache write hit, the system writes data into the cache and sets a "dirty bit" which indicates that a data word has been written into the cache but not into the main memory. A cache controller checks for a dirty bit before overwriting any line of data in the cache, and if set, writes the line of data out to main memory before loading the cache with new data.

An advantage of the write-back method is a decreased amount of main memory accesses as compared with the write-through method. The write-back method accesses the main memory less often than the write-through method because the number of times that the main memory must be updated with altered cache information is usually lower than the number of write accesses. This, of course, reduces the amount of traffic on the main memory data bus, which can result in higher performance than a write-through cache if writes to the main memory are comparatively slow.

Accordingly, it would be desirable to provide a cache-based system that utilizes advantageous features of both the write-through and write-back methods, while also avoiding disadvantages of either method.

SUMMARY OF THE INVENTION

Accordingly, it is an object of the present invention to provide a method of accessing the memory of a computer system having advantages of both the write-back and write-through methods.

It is another object of the present invention to utilize advantages of both the write-back and the write-through methods while avoiding disadvantages of either method.

In that regard, it is also an object of the present invention to reduce the number of writes to DRAM while avoiding penalties in system performance caused when a "dirty" line of cache data needs to be written out to main memory before a cache-miss read access can take place.

Roughly, the present invention provides a method and an apparatus for reducing the overall average access time required to write to and read from memory in a cache-based computer system. The present invention is a compromise between the write-back and write-through methods of accessing main memory. Logic of the present invention determines whether data should be written to the cache with a dirty bit asserted, or the data should be written to both the cache and main memory and the dirty bit either cleared or left unchanged.

The inventors of the present invention have determined that writing to DRAM can be substantially as fast as writing to the cache memory in certain situations—for example, when there is a page hit. In such a situation, the write-through method can be used instead of the write-back approach—thus providing both the speed advantage of the copy-back method and the updated DRAM advantage of the write-through method. Accordingly, the logic of the present invention uses the write-through method where the write-through method is approximately as fast as the write-back method. Where the write-back method is substantially faster than the write-through method, the write-back method is used.

The invention can be implemented in a system which provides for different options that can be selected through internal registers in the system:

(1) Write back method always;
(2) Adaptive method with write-through only for page hits with Row-Address-Strobe (RAS#) active;
(3) Adaptive method with write-through where RAS# is inactive, in addition to page hits with RAS# active; and
(4) Write through method always.

The adaptive method of the present invention can be advantageous as long as there are at least two different speeds at which the DRAM controller can respond to a write request—a faster and a slower speed.

The above example with a paged DRAM controller is given as a specific case where the DRAM controller may respond at three separate speeds. Another example may be a non-paged DRAM controller where cycles are delayed due to a pending DRAM-refresh request. This situation can use the write-through method if there is no refresh pending.

The present invention provides advantages over both the write-back and write-through methods. For a write-back method, when a cache read miss having a dirty condition occurs, the cache controller must write data present in the cache into the main memory (write-back method) before fetching new data. For the write-through method, all write cycles go to the slower main memory usually resulting in some additional delays in a particular CPU cycle. If a CPU (like Intel's 80486) is used which has an internal cache RAM, the number of the write cycles are much more than read cycles. With the present invention, it is possible to use the advantages of the write-through and write-back methods. A particular advantage of the present invention over the write-through method is a reduction in write traffic to the memory, similar to the copy-back method. An advantage of the present invention over the copy-back method is a reduction of copy-back cycles which are much longer in length as compared to standard write cycles. As a result, throughput of a cache-based system is improved over both the copy-back and write-through methods.

BRIEF DESCRIPTION OF THE DRAWINGS

The invention will be described with respect to particular embodiments thereof and reference will be made to the drawings, in which:

FIG. 4a is a schematic of comparison logic shown in FIG. 3.

FIG. 4b is a schematic of ready logic shown in FIG. 3.

DETAILED DESCRIPTION OF THE INVENTION

Figure 1:
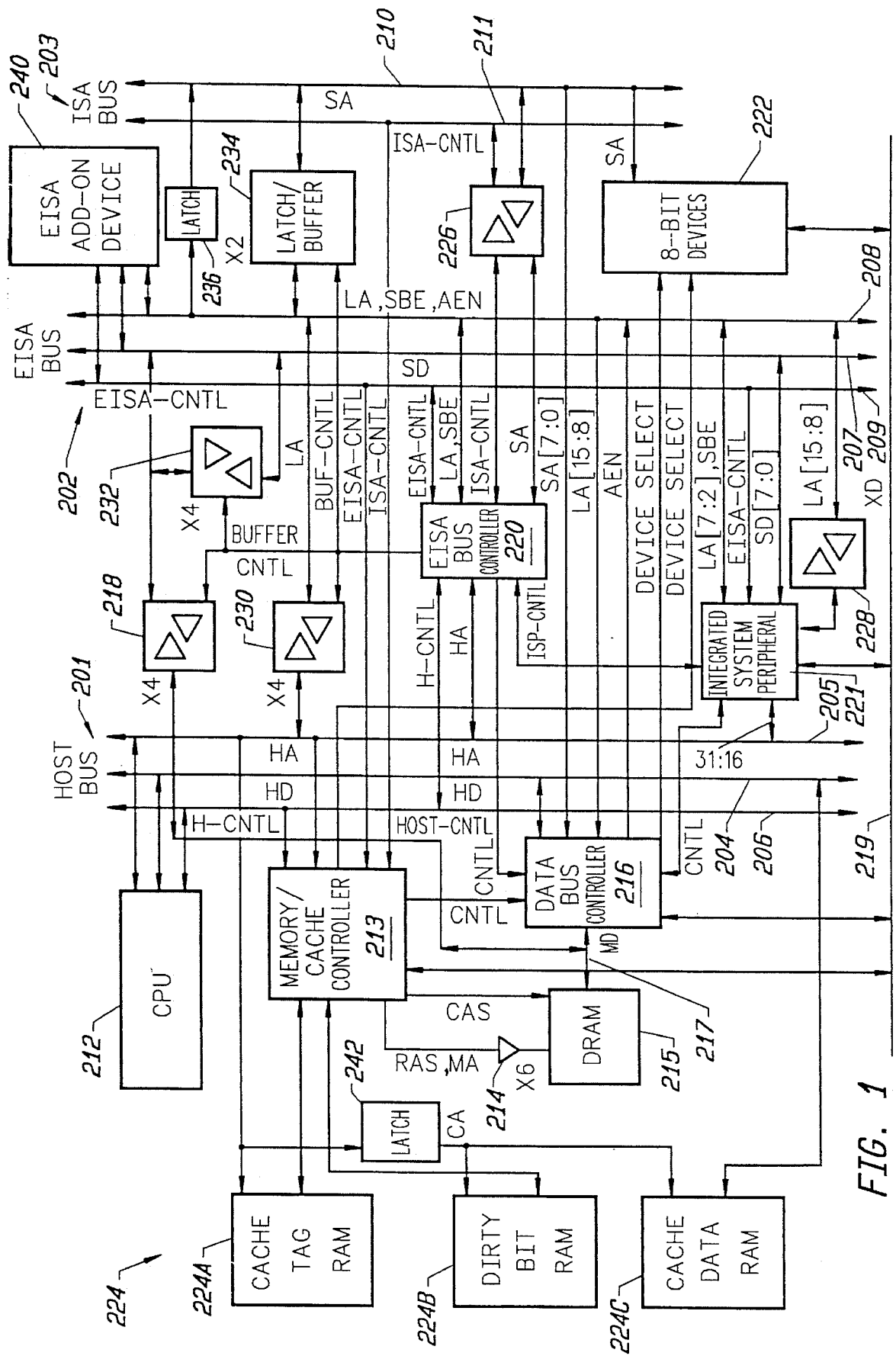
FIG. 1 is a block diagram of an EISA-compatible computer architecture that may incorporate the present invention.

Turning now to the drawings, FIG. 1 is a simplified block diagram of important features of an EISA-based microcomputer system that may incorporate the present invention. It comprises a host or CPU bus 201, an EISA bus 202, and an ISA bus 203. The host bus 201 includes HD data lines 204, HA address lines 205, and a plurality of control lines 206. The EISA bus 202 includes SD data lines 207, LA, SBE and AEN address lines 208, as well as EISA control lines 209, and the ISA bus 203 includes SA address lines 210 and ISA control lines 211. The ISA bus 203 does not include any data lines since such lines would be duplicative of the SD lines 207 on EISA bus 202. A CPU 212, such as an Intel 80486, as well as an optional numeric coprocessor (not shown), are coupled to the address, data and control lines of host bus 201. The address and control lines of host bus 201 are also connected to a memory/cache controller (MCC) 213, which is also connected to the EISA control lines 209 and to the ISA control lines 211.

The present invention may be incorporated within the component identified as MCC 213. MCC provides memory address and RAS information via buffers 214 to a DRAM array (host memory) 215, as well as providing CAS information to DRAM 215. The data lines of DRAM 215 are coupled over an MD bus 217 to a data bus controller (DBC) 216, which is also coupled via bi-directional buffers 218 to the SD data lines 207 of EISA bus 202. MD bus 217 is also coupled to the SD lines 207 via bi-directional buffers 218. The DBC 216 is also connected to the HD data lines 204 of host bus 201 bi-directionally, and is connected to receive SA(7:0) from the address lines 210 of the ISA bus 203 and LA(15:8) from the address lines 208 of EISA bus 202. DBC 216 generates eight AEN signals for EISA bus 202. Both the MCC 213 and the DBC 216 communicate bi-directionally with an 8-bit XD data bus 219. The DBC 216 receives control signals from the MCC 213, an EISA bus controller 220 (discussed below), and an integrated system peripheral 221 (discussed below). The DBC 216 also provides device select signals to a plurality 222 of 8-bit devices, the data lines of which are coupled to the XD bus 219. The plurality 222 can include a keyboard controller (KBC) and a realtime clock (RTC), among other things. The MCC 213 also provides device select signals to devices in the plurality, including a read-only memory (ROM) and CMOS RAM (CRAM). The system of FIG. I also includes a write-back cache subsystem 224 which is coupled to the HA address lines 205 of host bus 201, to the MCC 213, and to the H D data lines 204 of host bus 201.

More specifically, the cache subsystem 224 includes a cache tag RAM 224A, a dirty bit RAM 224B, and a cache data RAM 224C. The cache tag RAM 224A is addressed by low-order address bits from the host bus HA lines 205, and the dirty bit RAM 224B and the cache data RAM 224C are addressed by the same address bits via a latch 242. The data leads of the cache tag RAM 224A are connected bi-directionally to the MCC 213, as is the one-bit data lead of the dirty bit RAM 224B. The data leads of cache data RAM 224C are coupled bi-directionally to the host bus HD lines 204. Additionally, although not shown in FIG. 1, the MCC 213 generates a write enable signal for each of the RAMs 224A, 224B and 224C in the cache subsystem 224.

The system of FIG. 1 further includes the EISA bus controller (EBC) 220 mentioned above, which is further coupled to the host bus 201 control lines 206 and address lines 205, and to the EISA bus 202 control lines 209 and address lines 208. The EBC 220 is also coupled via bi-directional buffers 226 to the ISA bus 203 control lines 211 and address lines 210. The EBC 220 further provides and receives control signals to/from the integrated system peripheral 221.

The integrated system peripheral (ISP) 221 is coupled to host bus 201 address lines HA(31:16), XD data bus 219, and EISA bus 202 control lines 209, data lines SD(7:0), and address lines LA(7:2) and SBE. ISP 221 is further coupled via bi-directional buffers 228 to EISA bus 202 address lines LA(15:8).

The HA address lines 205 of host bus 201 are coupled via bi-directional buffers 230 to the LA address lines 208 of EISA bus 202. Bi-directional buffers 232 are coupled to SD data lines 207 of the EISA bus 202 for the purpose of swapping data bytes. The address lines LA(16:2) of EISA bus 202 are further coupled to provide information via a latch and buffer 234 to the SA(16:2) address lines of ISA bus 203, which are in turn coupled via a buffer in the latch/buffer 234 to provide information to the address lines LA(16:2) of EISA bus 202. An additional latch 236 couples other bits LA(19:17) of address lines 208 of EISA bus 202 to the SA(19:17) address lines 210 of ISA bus 203. The EBC 220 generates control signals for the buffers 218, 230 and 232 and latch/buffer 234. An EISA add-on device 240 is also shown coupled to the address, data and control lines of EISA bus 202.

The EBC 220 and ISP 221 are, respectively, 82C681 and 82C686 chips available from OPTi, Inc., Santa Clara, Calif. These chips are incorporated by reference herein, as is the databook publication OPTi-386/486 WB EISA Chipset (1991) describing these chips and earlier versions of the MCC 213 and DBC 216. Details of the OPTi EISA chipset other than as set forth herein are generally not important to an understanding of the invention and therefore will not be described.

The MCC 213 controls accesses to the local memory subsystem from the CPU 212, EISA/ISA masters and DMA devices. The memory subsystem consists of up to four banks of 512K/1M/2M/4M/8M ×36 DRAM using optional hidden refresh, and up to 1 MB of cache. The cache may be two-way interleaved for 486-compatible systems. The MCC 213 has an integrated cache controller with tag comparator (FIGS. 3 and 4a) which supports cache writes as well as reads. Cache sizes of 64 kB, 128 kB, 256 kB, 512 kB and 1 MB are supported. The MCC 213 operates in non-pipeline mode with a 16-byte line size (optimized to match a 486 burst fill cycle) in order to simplify the motherboard design without increasing cost or degrading performance. For 486-compatible systems, the cache memory 224 operates as a secondary cache independently of and in addition to the cache which is internal to the CPU 212. The built-in tag comparator in MCC 213 internally detects a cache hit by comparing the address memory location high-order address bits with the tag bits of the current cache entry. When a match is detected, and the location is cacheable, a cache-hit cycle takes place. If the comparator does not detect a match, or if a permanently or programmably non-cacheable location is accessed (based on the internal non-cacheable region registers or the shadow control registers), the current cycle is a cache-miss.

A "dirty bit" in Dirty Bit RAM 224B corresponds to each tag entry to indicate whether the data in the cache has been modified since it was loaded from secondary memory. This allows the MCC 213 to determine whether the data in the associated secondary memory location is "stale" and needs to be updated from cache before a new line from secondary memory overwrites the currently addressed cache line. The writeback cycle causes an entire cache line (16 bytes) to be written back to secondary memory followed by a burst line-fill from the new secondary memory location into the cache and CPU.

The cache/DRAM controller in the MCC 213 ensures that data is burst into the CPU 212 whenever the CPU requests an internal cache line fill (read cycles to cacheable memory not currently in the CPU's internal cache). The secondary cache 224 provides data on secondary cache read-hits and the DRAM provides data during secondary cache read-misses. For secondary cache read-hits, the MCC 213 asserts a Burst Ready signal (BRDY#, illustrated in FIG. 2) at the beginning of the first T2 state when zero wait states are required and at the beginning of the second T2 state when one wait state is required. BRDY# is asserted after the cache memory is updated for secondary cache read-misses. Once asserted, BRDY# stays active until BLAST# (Burst Last) is detected from the CPU 212. BRDY# is never active during DMA and EISA master cycles.

The MCC 213 allows the cache SRAMs to be interleaved in order to improve burst performance without having to use faster SRAMs. This interleaving is automatically selected whenever two banks of SRAMs are installed (64 kB, 256 kB and 1 MB cache systems).

The following cache cycles are possible with the MCC 213:

CaChe-Read-Hit. initiated by CPU. The cache memory provides data to the CPU. The MCC follows the CPU's burst protocol in order fill the processor's internal cache line.

Cache-Read-Hit, initiated by EISA/ISA/DMA Master. The cache memory provides the requested data.

Cache-Read-Miss (Dirty bit negated), initiated by CPU. The MCC 213 does not need to update DRAM with the cathe's current data because that data is unmodified. The cache controller asserts the write enable for cache tag RAM (TAGWE#), causing the cache tag RAM 224A to update its address information, and asserts the write enable for cache data RAM (CAWE#), causing the cache data RAM to store new information from memory as it is read from DRAM. This new data is presented to the CPU 212 (following burst protocol).

Cache-Read-Miss (Dirty bit negated), initiated by EISA/ISA/DMA Master. DRAM provides the data, the cache is bypassed.

Cache-Read-Miss (Dirty bit asserted), initiated by CPU. The cache controller first updates secondary memory with data from the cache location that is going to be overwritten. The controller writes the 16-byte line from cache memory to the DRAM, then reads the new line from DRAM into cache memory and deasserts the DIRTY bit. The MCC asserts TAGWE#, CAWE#[3:0] and the dirty bit write enable signal (DIRTYWE#).

Cache-Read-Miss (Dirty. bit asserted), initiated by EISA/ISA/DMA Master. DRAM provides the data, the cache is bypassed.

Cache-Write-Hit. Discussed below in reference to present invention.

Cache-Write-Miss, initiated by CPU or by EISA/ISA/DMA Master. The cache controller bypasses the cache entirely and writes the line directly into DRAM. DIRTY is unchanged.

Up to two independent areas of memory can be defined as non-cacheable by the MCC. This is accomplished by programming Non-Cacheable-Area registers (NCA0, NCA1) with a starting address and block size for each region selected. Allowable block sizes range from 64 kB to 512 kB. In addition, addresses 3F00000h–3FFFFFFh are non-cacheable. Because DRAM accesses are much faster than EPROM accesses, the MCC provides shadow RAM capability to enhance system performance. Data may be read from EPROM, then write-protected into a dedicated area in DRAM having the same address range. Accesses to the specified EPROM space thereafter are redirected to the corresponding DRAM location. Shadow RAM addresses range from C0000h to FFFFFh. 16 kB granularity is provided for the address range C0000h to DFFFFh while 64 kB granularity is provided for the address range E0000h–FFFFFh (the location of system BIOS). Shadow control is provided by internal registers in the MCC. Additionally, these registers can selectively set some of the range C0000h–FFFFFh as cacheable. Table II describes some of the more important signal connection pins of MCC 213.

TABLE I

| Cache Size | Interleaved | DIRTY Bit | Tag Field Address | Tag RAM Size | Cache RAM Address | Cache RAMs | Cacheable Main Memory |
|---|---|---|---|---|---|---|---|
| 64kB | Yes | 4k × 1 | A23 - A16 | 4K × 8 | A15 - A4 | 8 - 8K × 8 | 16MB |
| 128kB | No | 8k × 1 | A24 - A17 | 8K × 8 | A16 - A4 | 4 - 32K × 8 | 32MB |
| 256kB | Yes | 16k × 1 | A25 - A18 | 16K × 8 | A17 - A4 | 8 - 32K × 8 | 64MB |
| 512kB | No | 32k × 1 | A26 - A19 | 32K × 8 | A18 - A4 | 4 - 128K × 8 | 128MB |
| 1MB | Yes | 64k × 1 | A26 - A20 | 64K × 8 | A19 - A4 | 8 - 128K × 8 | 128MB |

TABLE II

| CLOCK AND RESET | | |
|---|---|---|
| CLK | I | Host Clock. Master single-phase CPU clock driven fmm an external dock-generator circuit. This is the same signal that the CPU receives. |
| CLK2 | I | Clock2. This input is driven from an external oscillator circuk without any external division. In systems at or below 33 MHz, this dock signal input is twice the CPU's rated frequency. CLK2 Is used for CAWE[3:0]# generation if the cache's Early Write Enable feature is turned on (Reg C31 h <0 >is set). |
| RST# | I | Reset. RST# is an input from the EBC that resets the MCC (this same reset signal is also connected to the ISP, DBC, and 8042). The EBC asserts this signal based on powergood and reset switch functions. ('#' indicates active low signal.) |
| Address/Status | | |
| HA[31:2] | I | Host Address Bus. Connected to the Host CPU A[31:2] bus. The MCC uses these 30 address lines for internal memory decoding and to generate the memory address bus (MA[10:0]) and the low-order cache addresses (CAA3_[1:0], CAA2). The HA[31:2] bus is also used to determine all MCC internal register decodes. |
| HBE[3:0]# | I | Host Byte Enables [3:0]. Connected to Host CPU BE[3:0]#. These signals determine vaild bytes during DRAM/cache writes and MCC internal register accesses. |
| HM/IO# | I | Host Memory/IO#. Connected to Host CPU M/IO#. This is sampled at the same time as HA[31:2]. This signal is not used by ISA Masters. |
| HD/C# | I | Host Data/Control#. Connected to Host CPU D/C#. This is sampled at the same time as HA[31:2]. |
| HW/R# | I | Host Write/Read#. Connected to ISP & Host CPU W/R#. This is sampled at the same time as HBE[3:0]# except for ISA masters, when it is not used. |
| Host Interface | | |
| HADS# | I | Host Address Status. Connected to Host CPU ADS#. This is sampled at the rising edge of CLK and when active, indicates vaild address/status on the host address bus. |
| BLAST# | I | Burst Last. This is the BLAST# signal from the CPU and is sampled on the rising edge of CLK except in T1 and the first T2. |
| RDYI# | I | 486 Ready In. Directly connected to the RDY# pin of the CPU and is used by other devices to indicate the end of the current cycle (a weak internal pull-up is provided). |
| BRDY# | O | Burst Ready. This signal is connected to the BRDY input of the 486. The MCC drives this line active (low) to indicate the end of a host CPU to local memory cycle. |
| Arbiter | | |
| HHLDA | I | Host Hold Acknowledge. Connected to HHLDA from the host CPU. This indicates an EISA/ISA/DMA/Refresh access. |
| EMSTR16# | I | ISA Master. This input, from the ISP, indicates that an ISA master is in control of the Host/EISA bus. |
| MCCRDY | O | MCC Ready. This normally active (high) signal goes inactive (low) when a hidden refresh cycle is pending and returns active when the refresh cycle is over. It is connected to the EBC MCCRDY input. |
| Bus Interface | | |
| BCLK | I | EISA BCLK EISA system dock. Connected from BCLK of the EISA connectors. |
| START# | I | Start. This input indicates the beginning of an EISA/DMA/Refresh access and is connected to START# of the EISA connectors. This pin is also used in an MCC test mode. |
| CMD# | I | Command. Provides timing control within an EISA cyde. Connected to CMD# of the EISA connectors. This pin is also used In an MCC test mode. |
| MSBURST# | I | Master Burst. This Input is sampled at the rising edge at BCLK and indicates that an EISA burst mode transfer should be carried out. It is connected to MSBURST# |

TABLE II-continued

| CLOCK AND RESET | | |
|---|---|---|
| REFRESH# | I | Of the EISA connectors.<br>Refresh. Connected to REFRESH# of the EISA connectors. The leading edge of MRDC# is interpreted as a request to perform hidden refresh when this signal is active. |
| MRDC# | I | Memory Read Command. The MCC uses this input to indicate a DRAM/Cache read from a master device (EMSTR16# active). Also, when REFRESH# is active, the leading edge of MRDC# is interpreted as a request to perform hidden refresh. Connected to MRDC# of the EISA connectors. Also, if sampled low at the rising edge of MWRC# while RST# is high, MCC enters a test mode. |
| MWTC# | I | Memory Write Command. When EMSTR16# is active, the leading edge of MWTC# is used to start a DRAM/cache write. Connected to MWTC# of the EISA connectors. |
| Decode | | |
| HKEN# | O | Host cache enable. Connected to the KEN# of the 486. It is based on a decode of HA[31:17] and will be active for cacheable regions of memory. This signal is forced active from the end of a CPU cycle to the end of the first T1. |
| HLOCM# | O | Host Local Memory. Inhibits EISA/ISA cycle if active during a local Host master cycle. Connected to HLOCM# of the EBC. |
| GT1M# | B | Greater than 1MB. This signal uses HA[31:20] to decode memory accesses above 1MB (inactive for accesses in the 000XXXXXh range). It is connected to GT1M# of the EBC. |
| ROMCS0# | O | ROM Chip Select 0. During normal operation, it goes active when FFFFXXXXh or FXXXXh is decoded from HA[31:16]. It is connected to CS# of the BIOS ROM. |
| ROMCS1# | O | ROM Chip Select 1. ROMCS1# decodes a 16K/32K/64K block In the range C0000h thru EFFFFh based on the value programmed into the MCC's ROM/Shadow RAM configuration registers (C36h-C3Fh). |
| DRAM Interface | | |
| MA[10:0] | O | Multiplexed DRAM addresses. This bus provides row and column address Information to the DRAMs. External buffering is typically required. Note that for EISA master accesses, the HA bus should drive the MA through transparent latches. |
| RAS#E[3:0]<br>RAS#0[3:0] | O | Also sometimes referred to herein as RAS#(7:0). These outputs drive the RAS# to the four DRAM banks. RAS#[7:0] is generated synchronously from CLK for CPU/refresh access, from falling edge of BCLK15 to rising edge of BCLK for EISA/DMA access and from MRDC# or MWRC# for ISA access. RAS#E[3:0] drive side-0 of 4 SIMM sockets. RAS#O[3:0] drive side 1 of 4 SIMM sockets. |
| CAS3#[3:0]<br>CAS2#[3:0]<br>CAS1#[3:0]<br>CAS0#[3:0] | O | Column Address Strobes. CAS0#_[3:0] connects to byte lanes 3 thru 0 of DRAM bank-0. Similarly, each set of four CAS lines corresponds to a particldar 4-byte bank. To guarantee EISA memory access timing, these CAS signals should be connected directly (without external buffering) to the local memory DRAMs. Note that all reads to DRAM are 32-bits wide. |
| WE# | O | Write Enable. This signal is externally buffered to drive the WE# input of the DRAM's. WE# transitions with similar timing to RAS#[7:0]. The transitions are synchronous from CLK (for CPU accesses) or from MWTC# (for EISA/ISA/DMA accesses). |
| Cache Interface | | |
| TAG26/18<br>TAG25/17<br>TAG24/16<br>TAG[23:19] | B | Cache Tag Data Bus. Connected to the tag SRAM data bus. The tag number corresponds to the Host address line that it will be compared against. The tag bus is always 8 bits wide. For CPU accesses, the tag bits are sampled at the falling edge of CLK In the first T2. For EISA/DMA, they are sampled at the rising edge of BCLK30. For ISA masters, they are sampled at the leading edge of MRDC# or MWRC#. |
| TAGWE# | O | Tag Write Enable. Connected to tag SRAM WE#. |

TABLE II-continued

CLOCK AND RESET

| | | |
|---|---|---|
| | | This signal is active during CPU read-miss cycles when the cache gets updated. |
| DIRTYI | I | Dirty bit input. The dirty bit indicates whether the data In the cache has been modified. It is connected to the data output pin of the dirty-bit SRAM. Internally sometimes referred to as IDIRTY. |
| DIRTYO | O | Dirty bit output. CAnnected to the data input pin of the dirty-bit SRAM. |
| DIRTYWE# | O | Dirty bit Write Enable. This signal goes active when the host CPU writes into the cache. It is connected. to the WE# pin of dirty-bit SRAM. |
| XCA30E# | O | External Cache address 3 Output Enable. Allows the CPU address lines HA2 and HA3 to drive the cache SRAM. Connected to the OE# of the buffer between HA3 and CAA3[1:0], HA2 and CAA2. |
| CAA31 | O | Cache Altered Address 3 (odd). Connected to cache bank-1 A3. |
| CAA30 | O | Cache Altered Address 3 (even). Connected to cache bank-0 A3. |
| CAA2 | O | Cache Altered Address 2. Connected to the cache address line A2. |
| HACALE | O | HA bus to CA bus Latch Enable. This output provides the proper control timing to the latches that create the cache address bus CA[19:4] from the HA bus. This normally active signal goes inactive at the end of a host write or EISA/DMA access to provide sufficient hold time on the CA bus. |
| CACS#[1:0] | O | Cache Memory Chip Selects. Connected to cache-memory CS# for odd & even banks respectively. These outputs are dependent upon the DRAM size, shadow -control, and cache mode bits. When the cache is intedeaved, these normally active signals go inactive when there is a cache write to the opposite bank of cache. |
| CAWE[3:0]# | O | Cache Write Enables. Connected to cache-memory WE# pins for byte lanes 3 thru 0. These signals are derived from CLK2 if the MCC's Early Write Enable feature is set (Reg C31 <0> = 1). |

Data/Parity

| | | |
|---|---|---|
| CDOE[1:0]# | O | Cache Data Output Enable. Used to enable data from the cache SRAM onto the local HD bus. CDOE0# always controls the low cache data SRAM bank and CDOE1 # is used for the upper bank only when cache intereaving is selected (64k/256k/1M cache size). |
| XD[3:0] | B | X-Data Bus. The MCC uses the low-order nibble of the XD bus to provide the programming data for its internal registers. The upper four bits are ignored during I/O programming cycles to the MCC. |
| MDHDOE0# | O | Memory to Host Data Output Enable. This control signal enables instructs the DBC to enable data from the MD onto the HD bus for CPU DRAM reads. It is connected to MDHDOEO# of the DBC. |
| MDHDLE# | O | Connected to MDHDLE# of the DBC. This is a normally inactive signal. When active forces the data sampling latch on MD[31:0] to be transparent it goes active during EISA/ISA/DMA master reads from cache. It is also used to latch the MP bits for parity checking for all DRAM read cycles. It is faster than CAS#. |
| HDLEINH# | O | Connected to HDLEINH# to the DBC. This signal is internally delayed by one CLK and used to control the HD bus latches. When the delayed signal is inactive, HD bus latches are transparent during all CLK low periods. When the delayed signal is active, HD bus latches hold their data. This goes active in the first T2 of all memory write cycles. This also goes active in burst write cycles (initiated by a local device other than a 486-compatible CPU), and also for write-back cycles. |
| HDMDOE# | O | HD/MD Output Enable. This signal enables the HD bus onto the MD bus and is active for all CPU memory writes including cache hit cycles. It is connected to HDMDOE# of the DBC. |
| PAREN# | O | Parity Enable. PAREN# provides a timing pulse to the DBC after valid DRAM data has been read into the DBC. This pulse is used as the timing strobe to check for parity errors. It is connected to PAREN# of the DBC. |

TABLE II-continued

CLOCK AND RESET

EISA-Timing Signals

| | | |
|---|---|---|
| BCLK15 | I | BCLK-15. 15ns delayed version of BCLK from the external delay line. |
| BCLK30 | I | BCLK-30. 30nS delayed version of BCLK from the external delay line. |

The EBC 220 generates the EISA bus clock (BCLK) as well as the keyboard clock while also providing board level and CPU/Coprocessor reset signals. In addition, the EBC controls the interface between the EISA bus and the Host bus and arbitrates between Host/EISA/ISA Masters, DMA controllers, and Refresh requests for the EISA bus. It directs the steering logic of the DBC 216 and the ISP 221 and provides latch/buffer controls for address/data byte lane translation/ swapping. Additionally, it provides the address translation between masters and slaves for addresses A20 and A[1:0].

The EBC interfaces directly with the local CPU 212 on the Host bus 201. This interface is used to track host bus cycles when the CPU 212 or other local device is the current master on the host bus 201. When a host cycle is initiated, the EBC 220 determines whether any local slave is responding. If a local device is not the target of the cycle, then the EBC 220 will activate its EISA/ISA interface logic to complete the instruction. The EBC 220 waits until the completion of the EISA/ISA portion of the cycle before terminating the cycle on the host bus 201.

The EISA/ISA interface of EBC 220 monitors cycles initiated by EISA or ISA masters and watches their corresponding buses to detect a slave response. The correct cycle will then be generated on the responding slave's bus (EISA or ISA). The EISA/ISA interface accepts cycles from the host interface and will run the appropriate cycles on the EISA or ISA bus 202 or 203. If necessary, the EISA/ISA interface will perform multiple cycles (assembly/disassembly) for a single host cycle. When the translation is completed, the host interface is informed to terminate the cycle on the local bus. The EISA/ISA interface also informs the host interface when the host can change the address for the next cycle. The individual pin connections for the EBC 220 are set forth in the above-mentioned OPTi EISA Databook.

The ISP 221 is an integrated system peripheral chip which integrates two timers, EISA NMI/Time-out logic, two modified 8259-type interrupt controllers, the EISA DMA/Refresh controller, and the EISA system arbiter. It also integrates the logic required to create the local peripheral bus (XD-bus 219) by providing internal buffering between SD[7:0]on EISA bus 202 and XD[7:0]. Also, data read from internal ISP 221 registers is presented directly on the SD bus. A description of the individual pin connections of the ISP 221 may be found in the above-mentioned OPTi EISA Databook.

The DBC 216 performs various steering logic and control/ decode functions. It integrates data buffers and provides data buffer control, XD 219 bus control, AEN generation, parity generation/checking logic, decode logic for an external keyboard controller, real time clock control, as well as EISA ID register support and general purpose chip selects.

The DBC 216 performs data bus conversion when a system master accesses 8, 16, or 32-bit devices through 16-bit or 32-bit instructions. The DBC 216 also handles DMA and EISA bus master cycles that transfer data between local DRAM or cache memory and locations on the EISA bus 202. The DBC receives data buffer control signals from the EBC 220 and the ISP 221. It generates XD bus control signals XDEN# and XDRD#.

The DBC 216 also generates chip select signals for the keyboard controller, real time clock chip, and the configuration registers in EBC 220.

It also generates control logic based on address decoding for numeric coprocessor error clearing, the EISA ID register, the real time clock chip, configuration NVM and Fast CPU warm resets. A description of the pin connections of a prior version of the DBC 216 may be found in the above-mentioned OPTi EISA Databook; any differences between DBC 216 and the prior version are not important for an understanding of the invention.

The chipset 213, 216, 220, 221 of FIG. 1 operates in response to a plurality of command and configuration registers which are directly addressable by the CPU 212 in the I/O address space. The fields of the registers also are mostly not important to an understanding of the invention and may be determined in part from the above-mentioned OPTi EISA Databook. The MCC 213 has several register fields which may be relevant, however, and these are described below in Table III.

TABLE III

| Cache Configuration Register 1 | Indicates Cache Size and Max. Cacheable DRAM | | |
|---|---|---|---|
| | 210 | Cache Size | Cacheable DRAM |
| I/O Addr C40h, Bits 2:0 | 000 | 64K | 16M |
| | 001 | 128K | 32M |
| | 010 | 256K | 63M |
| | 001 | 512K | 0–63M, 64M–128M |
| | 100 | 1M | 0–63M, 64M–128M |
| Cache Configuration | Cache Mode Select: | | |
| Register 1 I/O Addr C32h, Bits 1:0 | 00 | Enable | Enables normal cache operation. |
| | 01 | Disable | Disables cache. DRAM reads will invalidate the tag and clear the dirty bit. Cache memory may be completely flushed by reading a block of memory equal to the |

TABLE III-continued

| | | | |
|---|---|---|---|
| | | | cache size. (Default). |
| | 10 | Test-1 | All accesses go to DRAM. Upon a DRAM read, the tag and dirty-bit is written with the values defined in I/O registers C4Dh thru C4Fh. |
| | 11 | Test-2 | All accesses go to DRAM. Upon a read miss, the tag and dirty-bit is read lrdo registers C4Dh thru C4Fh. |
| Shadow RAM Control Registers I/O Addr C36h, C37h, C38h, C39h, C3Ah, C3Bh, C3Ch, C3Dh, C3Eh, C3Fh | colspan="3" | Each 16K block between C0000h to DFFFFh can be individually shadowed. Each 16k block between C0000h to C7FFFh can also be made cacheable for host CPU only. The MCC 213 will not respond in this area for EISA/DMA/ISA accesses. Each 64K segment between E0000h to FFFFFh can also be controlled in the same fashion (E0000h-EFFFFh is shadowable and F0000h-FFFFFh is shadowable and cacheable). These registers are defined further below. |
| Non-cacheable Block 0 Registers I/O Addr C41h, C42h, C43h, C44h | colspan="3" | Define the size and start address for non-cacheable memory block 0. |
| Non-cacheable Block 1 Registers I/O Addr C45h, C46h, C47h, C48h | colspan="3" | Define the size and start address for non-cacheable memory block 1. |
| Hole in Memory Register I/O Addr C49h, C4Ah, C4Bh, C4Ch | colspan="3" | Define the size and start address for a hole in memory space (no cache, no DRAM). |
| Tag-Bit-Test-Mode-Register I/O Addr C4Dh, Bits 3:0 | colspan="3" | Readable/Writable register for writing any desired information to Tag RAM or reading a Tag RAM entry. |

| Register Bit | Memory Address Bit In Tag RAM |
|---|---|
| 3 | TAG22 |
| 2 | TAG21 |
| 1 | TAG20 |
| 0 | TAG19 |

| | |
|---|---|
| Tag-Bit-Test-Mode-Register I/O Addr C4Eh, Bits 3:0 | Readable/Writable register for writing any desired information to Tag RAM or reading a Tag RAM entry. |

| Register Bit | Memory Address Bit in Tag RAM |
|---|---|
| 3 | TAG26/18 |
| 2 | TAG25/17 |
| 1 | TAG24/16 |
| 0 | TAG23 |

| | | |
|---|---|---|
| Dirty-Bit-Test-Mode-Register I/O Addr C4Fh, Bit 0 | colspan="2" | Readable/Writable register for writing any desired Information to Dirty Bit RAM or reading a Dirty Bit RAM entry. Bits 3:1 are unused. |
| I/O Addr C32h, | (WPLCY1, WPLCY0) | Write Policy |
| Bits 3:2 | 00 | Always use write-back method. |
| | 01 | Write-through in case of page hit and no refresh pending, else write-back. |
| | 10 | Write-through in case of page hit or RAS inactive, and no refresh pending, else write-back. |
| | 11 | Always write-through. |

The individual bits of each 4-bit field in the Shadow RAM Control Registers described in Table III are defined as follows:

Bit-0: RE — 1 enables CPU read from DRAM if bit 3 is 0
Bit-1: WE — 1 enables CPU write to DRAM
Bit-2: CE — 1 makes the referenced address range cacheable
if the range has been shadowed
Bit-3: ROM — 1 enables decode of a ROM chip select output and inhibits DRAM read Table IV defines the correspondence between the secondary memory address ranges and the 4-bit register fields which refer to them in the Shadow RAM Control Registers.

Table IV also indicates which of the above bit functions are active.

TABLE IV

| Register Addr | Start Addr | Block Size | Bit 3 | Bit 2 | Bit 1 | Bit 0 | Default |
|---|---|---|---|---|---|---|---|
| C36h | C0000h | 4000h | ROM | CE | WE | RE | 0000 |
| C37h | C4000h | 4000h | ROM | CE | WE | RE | 0000 |
| C38h | C8000h | 4000h | ROM |    | WE | RE | 0X00 |
| C39h | CC000h | 4000h | ROM |    | WE | RE | 0X00 |
| C3Ah | D0000h | 4000h | ROM |    | WE | RE | 0X00 |
| C3Bh | D4000h | 4000h | ROM |    | WE | RE | 0X00 |
| C3Ch | D8000h | 4000h | ROM |    | WE | RE | 0X00 |
| C3Dh | DC000h | 4000h | ROM |    | WE | RE | 0X00 |
| C3Eh | E0000h | 10000h | ROM |   | WE | RE | 0X00 |
| C3Fh | F0000h | 10000h | ROM | CE | WE | RE | 1000 |

The MCC 213 also generates write enable signals for the cache tag and dirty bit RAMS. Each write enable signal comprises a falling edge followed by a rising edge. The data is written into the RAM while the write enable signal is low, and is latched there when the write enable signal returns high. The output enables for these RAMs are permanently tied active, so they will always drive their respective data buses except while the write enable is low, at which time the MCC 213 drives the data buses.

Figure 2:
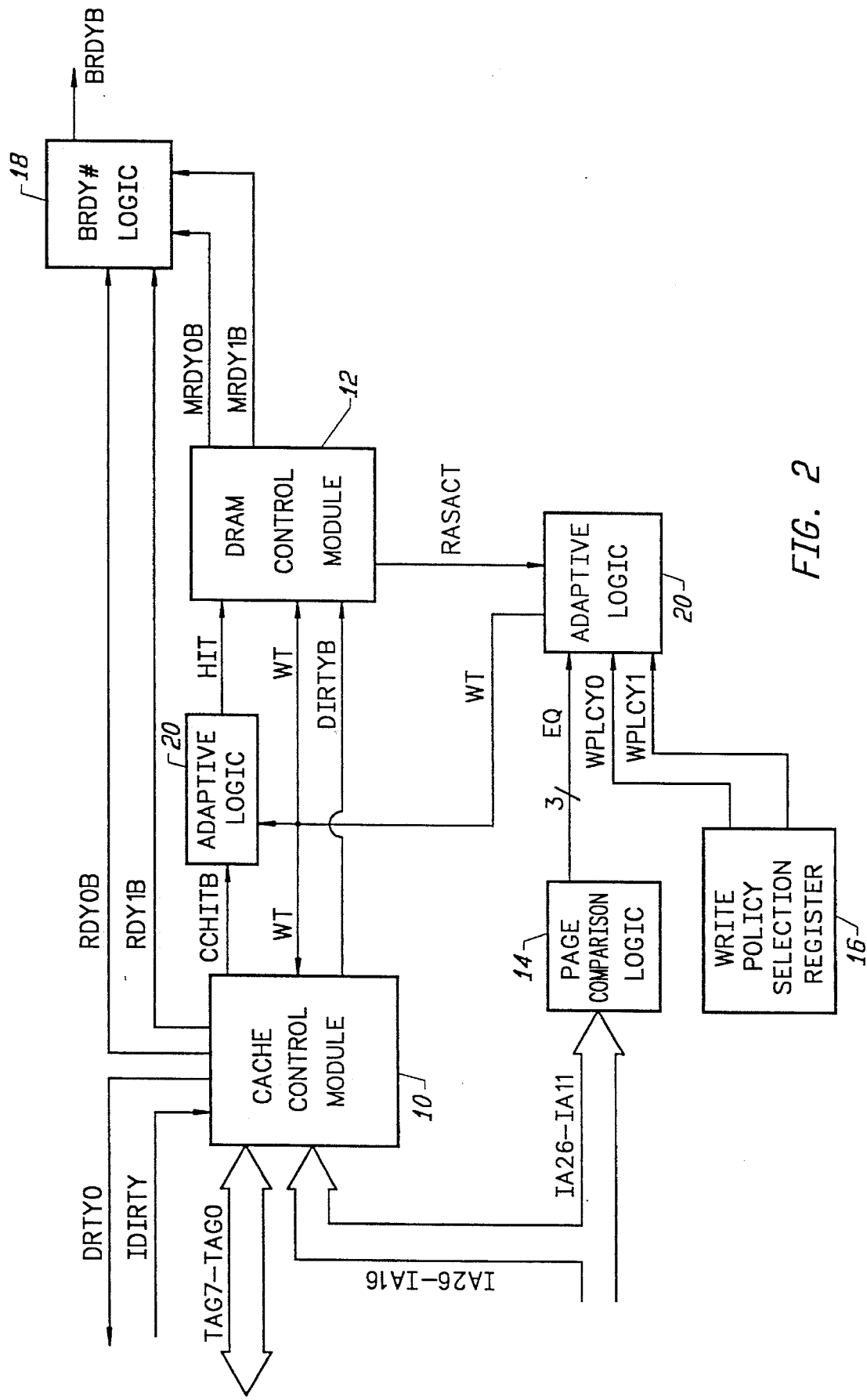
FIG. 2 is a simplified block diagram of basic components of an embodiment of the present invention.

Referring now to FIG. 2, a simplified block diagram is shown illustrating components utilized in an embodiment of the present invention. These components are preferably incorporated into the MCC 213 component shown in FIG. 1. FIG. 2 includes a cache control module 10, a DRAM control module 12, page comparison logic 14, a write policy selection register 16, and logic 18 to generate a BRDY# signal which is asserted to the CPU after a read or write cycle completes. The various components and inputs and outputs shown in FIG. 2 will be discussed below in further detail. FIG. 2 is intended to illustrate an overall block diagram of the invention to facilitate an understanding of the disclosed invention.

in the embodiment described herein, the invention is implemented as a set of modifications to the chipset described in the parent application. That chipset implements a write-back policy. The parent application is incorporated by reference herein, and to the extent possible, only the modifications and those aspects of the parent chipset needed to understand the invention, are described herein. The modifications are implemented primarily in the Adaptive Logic blocks 20 shown in FIG. 2.

In particular, on a CPU write to memory where a cache hit occurs, if a write-through to DRAM is to be forced in place of a write-only to the cache and dirty bit set as in the chipset of the parent application, three modifications should take place. First, the DRAM control module should write the data to main memory; this is accomplished by indicating to the DRAM control module that the cache write hit was actually a cache miss. Second, the ready indication which the cache control module would otherwise provide to the CPU should now be delayed(if necessary) until the DRAM control module completes its write to main memory; this is accomplished by inhibiting the RDY signals otherwise generated by cache control module 10 and deferring to those generated by the DRAM control module 12. Third, the dirty bit should no longer be modified; this is accomplished by latching the existing dirty bit data and writing it back into the dirty bit RAM unchanged.

As shown in FIG. 2, the cache control module 10 is coupled to the eight bi-directional data leads TAG(7:0) of the cache tag RAM 224A (FIG. 1) as well as to high-order host address leads IA(26:16). It also receives the input dirty bit over a IDIRTY lead from the data output lead of dirty bit RAM 224B and generates the output data DRTYO which the MCC 213 drives onto the dirty bit RAM 224B data input lead. Cache control module 10 also receives a WT signal from adaptive logic 20 which, as described in more detail below, indicates that a write-through function should be forced in the present CPU write cycle. The cache control module 10 generates a CCHIT signal indicating a cache hit, and also generates two ready signals RDYOB and RRDY1B which are used by BRDY# logic 18 to determine when a BRDY# signal should be returned to the CPU to terminate the cycle.

The CCHIT signal from cache control module 10 is provided to a portion of the adaptive logic 20 which also receives the WT signal. Adaptive logic 20 combines these two signals to generate an HIT signal provided to DRAM control module 12.

DRAM control module 12 receives both the HIT signal and the WT signal and generates (in addition to RAS# and CAS# signals for the DRAM) a RASACT signal for the adaptive logic 20 indicating whether the RAS# lines to DRAM are presently active. DRAM control module 12 also generates two ready signals MRDYOB and MRDY1B provided to the BRDY# logic 18. The MRDYOB signal generally indicates completion of a 0-wait state DRAM access and the MRDY1B signal generally indicates completion of a 1-wait state DRAM access.

BRDY# logic 18 receives the four signals RDYOB, RRDY1 B, MRDYOB and MRDY1B and from them generates BRDYB for the CPU 212. Activation of any of the input signals to BRDY# logic 18 will in turn activate BRDYB.

Page comparison logic 14 receives the page portion of the host address leads IA(26:11) and generates three equality signals EQ26_21, EQ20_16 and EQ15_11 indicating that respective portions of the present page address match corresponding portions of the previous page address. The three equality signals are combined as hereinafter described in adaptive logic 20.

Write policy selection register 16 is a conventional configuration register which is directly addressable by the CPU in the I/O address space, and which is programmable by the user to indicate which write policy should be followed by the chipset. The values of the two write policy bits WPLCY0 and WPLCY1 are provided to adaptive logic 20. Adaptive logic 20 generates the WT signal referred to above from the three page equality signals, WPLCY0, WPLCY1, and RASACT.

Figure 3:
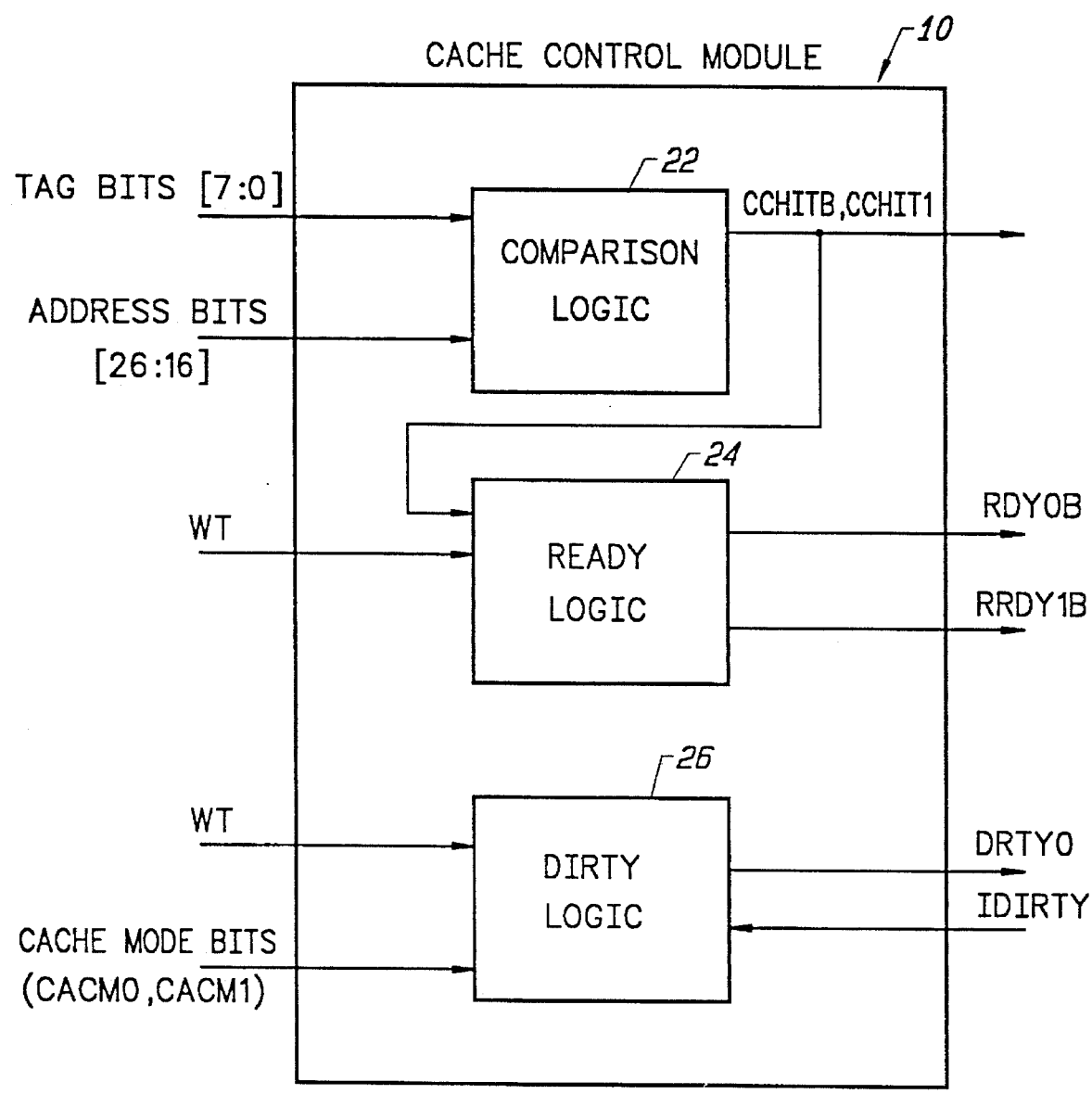
FIG. 3 is a block diagram of the cache control module shown in FIG. 2.

Referring now to FIG. 3, the cache control module 10 is illustrated as including comparison logic 22, ready logic 24, and dirty logic 26. Other circuits are also included, but are not important for an understanding of the invention and therefore are not shown. The comparison logic 22 provides conventional cache tag match logic that generates a CCHITB signal in response to a cache hit. The comparison logic 22 compares tag bits [7:0]with selected ones of address bits [26:16]by conventional techniques to determine whether a cache hit has occurred.

The ready logic 24 outputs two ready signals RDYOB and RRDY1B. RDYOB generally indicates completion of a 0-wait state cache access and RRDY1B generally indicates completion of a 1-wait state cache access. The CCHITB and WT signals are provided to the ready logic 24 to determine the output status of the ready signals. The WT signal, which will be discussed later in reference to the invention, indicates that a writethrough operation is to be forced.

The dirty logic 26 receives the IDIRTY input and generates the DRTYO output bit which is to be written to dirty bit RAM 224B (FIG. 1). When the dirty bit in dirty bit RAM 224B is high, it indicates a respective line of cache memory has been written into and contains new data which is different from the corresponding entry in DRAM. The dirty logic utilizes the WT input signal and cache mode bits (CACM0, CACM1) in determining the status of the DRTYO output.

FIG. 4a is a schematic of the comparison logic 22 shown in FIG. 3. As shown in FIG. 4a, a comparator 28 is provided which receives on its A(7:0) inputs the eight tag data bits TAGI(7:0) from cache tag RAM 224A (FIG. 1). It receives on its B(4:1) inputs the information on the host address lines IA(23:20), it receives on its B0 input a signal identified as TAGO00, and it receives on its B(7:5) inputs respective signals identified as TAGO77, TAGO66 and TAGO55. TAGO00 is selectably host address line IA19, for cache sizes below 1 MB, or 0 for a cache size of 1 MB. TAGO77 is selectably IA26 or IA18; TAGO66 is selectably IA25 or IA17; and TAGO55 is selectably IA24 or IA16, depending on the cache size programmed into configuration register address C40h, bits 2:0. The A=B output of tag comparator 28 is a CCHIT1 signal, which indicates a cache hit. The CCHIT1 signal is provided to one input of a 2-input NAND gate 32. The other input of the NAND gate 32 is coupled to a cache enable signal (CAEN), and the output of the NAND gate 32 is CCHITB which is provided to the ready logic as shown in FIG. 4b along with CCHIT1. The CCHITB signal is not active unless both input signals CCHIT1 and CAEN are high at the same time. Therefore, a low CCHITB signal only occurs when the cache is enabled (CAEN signal is high) and a cache hit occurs (CCHIT1 signal is high). CAEN is active when cache mode '00' is selected (register address C32h bits 1:0 are both 0).

FIG. 4b is a schematic diagram of the ready logic 24 shown in FIG. 3. The ready logic generates signals RDYOB and RDY1. RDYOB is connected the output of a NAND gate 51, the four inputs of which are connected to receive a WTB signal (the complement of WT), the CCHIT signal from comparison logic of FIG. 4a, an INCAB signal, and the output of a NAND gate 50. The first input of NAND gate 50 is connected to the output of a NAND gate 48, which is connected to receive three signals START, IWRB and CACF0. The other input of NAND gate 50 is connected to the output of a four-input NAND gate 49, the inputs of which are connected to receive START, an IWR signal, an IDCB signal, and a WOWS signal. Other than WTB and CCHIT1, the functions of the various inputs to gates 48, 49, 50 and 51 are not important for an understanding of the invention. Briefly, however, START (which is an internal MCC signal different from the EISA bus START# signal) carries a one-CLK wide high-going pulse at the beginning of a cycle; IWRB and IWR indicate a write cycle when asserted; CACF0 is a value from a cache read wait state configuration register; and WOWS indicates a zero-wait-state cache write configuration. It can be seen that without the WTB signal, the ready logic would activate RDYOB when all three of the signals INCAB, CCHIT1 and the output of NAND gate 50 are high. Now, however, if WT is active (WTB=0), RDYOB will be inhibited.

The RDY1 signal of the ready logic of FIG. 4b is connected to the Q output of a flip-flop 37, the D input of which is connected to the output of a two-input OR gate 36. The flip-flop 37 is clocked by SCLK, which operates at the same frequency as the host bus CLK signal. One input of the OR gate 36 is connected to the output of a NOR gate 39 and the other is connected to the output of a NOR gate 38. The NOR gate 39 has six inputs which are connected to receive, respectively, a signal provided by a NOR gate 39A, an STARTB signal which is the complement of START, the CCHITB signal, WT, an NCA signal and an END1 signal. The two inputs of NOR gate 39A are connected to receive a WRB signal and an IDCB signal, respectively. The QN output of flip-flop 37 forms the RDYI B output which is also connected to one input of the NOR gate 38. The other input of NOR gate 38 is connected to receive END1.

As with the RDYOB circuitry, the particular inputs provided to the RDY1 circuitry are unimportant to an understanding of the invention except for the WT and CCHITB signals. Briefly, however, NCA indicates a non-cacheable address; END1 is a one-CLK wide high-going pulse indicating the end of a cycle; WRB carries the same value as IWRB, though buffered differently; and IDCB follows the host bus D/C# signal. It can be seen that without WT provided as an input to the circuit, the output of NOR gate 39 (identified as HIT1WS) would be low as long as any of the inputs to NOR gate 39 are high. Only when all the inputs to NOR gate 39 are low would HIT1WS be high. Assuming the output of NOR gate 38 is low, therefore, the flip-flop 37 would load in a logic 0 on each rising edge of SCLK until all of the inputs to NOR gate 39 go low. The logic 0 in flip-flop 37 appears as a logic I on its QN output, which is provided as one of the inputs to NOR gate 38, thereby reinforcing the logic 0 on the output of NOR gate 38.

With the inclusion of the WT signal, it can be seen that HIT1WS will remain low, as will RDY1, as long as WT is active. Only when WT returns to its inactive state can RDY1 go high. The circuitry which generates RRDYIB from RDY1 is also not important for an understanding of the invention, except to note that RDY1 is provided as one input of the NAND gate 46 which generates RRDYI B. Thus only when WT=0 can RDY1 go high and permit RRDYIB to go low. RRDYIB therefore is effectively inhibited when WT is asserted.

Figure 6:
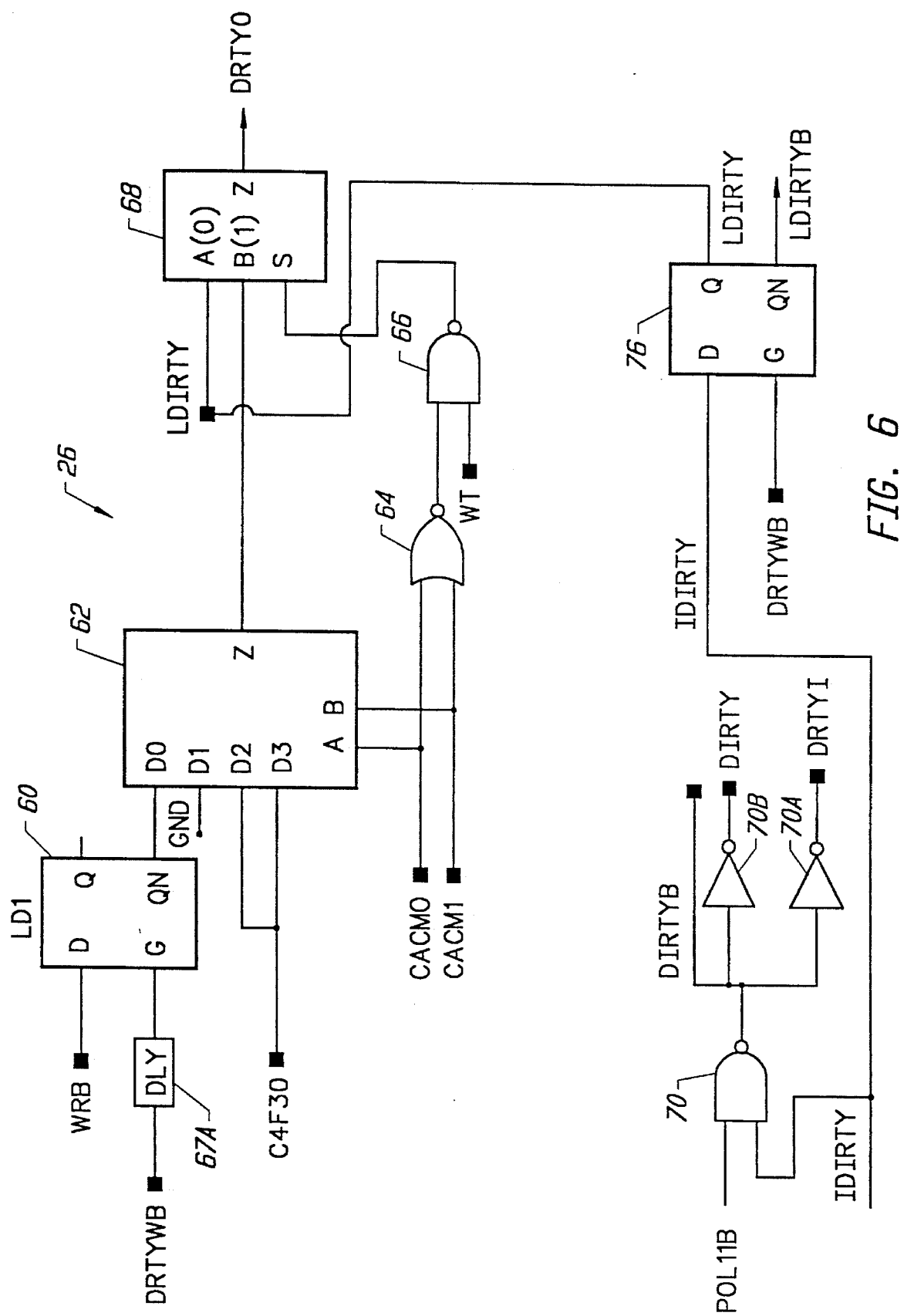
FIG. 6 is a schematic of dirty logic shown in FIG. 3.

FIG. 6 illustrates the dirty logic 26 shown in FIG. 3. The dirty logic generates the DRTYO output bit to be written to dirty bit RAM 224B in conjunction with the new data being written to cache by the CPU 212. As will be seen, the dirty logic will generate a 0 or 1 as required for the normal write-back cache policy, but when WT is active, the dirty logic will instead generate a copy of the prior contents of the dirty bit RAM 224B for rewriting therein. When WT is active, therefore, the contents of the dirty bit RAM 224B will remain unchanged.

Referring to FIG. 6, as described more fully in the parent application, the dirty bit normally generated by the circuitry is formed at the Z output of a four-input multiplexer 62. The DO input of multiplexer 62 is connected to the QN output of a latch 60, the D input of which is connected to receive the WRB signal and the enable input of which is connected to receive the DRTYWB signal from FIG. 5 via a small delay 60A. The WRB signal is low for a write access and high for a read access. The latch 60 is included to ensure the continued availability of WRB for writing to dirty bit RAM 224B in a cache write hit where write-back mode is used. The D1 input of multiplexer 62 is connected to ground, and the D2 and D3 inputs are connected together and to a C4F30 signal which is the output of a cache test mode register. The cache test mode register is not important for an understanding of the invention, but briefly, it is a register which the CPU may read or write to directly in the I/O address space for reading or writing desired information to or from cache tag RAM 224A and dirty bit RAM 224B.

The two select inputs A and B of multiplexer 62 are connected to receive CACM0 and CACM1, which are cache mode select bits programmed by the CPU. Cache mode '00' enables normal caching operation; cache mode '01' enables the writing of an invalid tag into cache tag RAM 224A and a logic 0 into dirty bit RAM 224B, and cache modes '10' and '11' are test modes for reading and writing desired information to the cache tag RAM 224A and dirty bit RAM 224B. Modes '01', '10' and '11'are described in detail in the parent application but are unimportant for an understanding of the present invention, except to note that during the power-up self-test procedures, cache mode '01' is used to write a logic 0 into every location in dirty bit RAM 224B. It is assumed herein that after the power-up self-test, cache mode '00' (normal caching enabled) is selected.

The Z output of multiplexer 62, which in the parent application is coupled via a buffer to the dirty bit RAM 224B data input lead, is instead connected in FIG. 6 to the B input of a two-input multiplexer 68. The Z output of multiplexer 68 forms the DRTYO signal which is coupled to the dirty bit RAM 224B data input lead. The A input of multiplexer 68 is connected to receive an LDIRTY signal which, as will be seen, is a latched version of the prior contents of the dirty bit RAM 224B. LDIRTY is connected to the Q output of a latch 76, the D input of which receives the IDIRTY signal from the data output lead of dirty bit RAM 224B. The QN output of latch 76 forms an LDIRTYB signal, and the enable input of latch 76 is connected to receive the DIRTYWB signal.

The IDIRTY signal, in addition to being coupled to the D input of latch 76, is also coupled to one input of a two-input NAND gate 70, the other input of which is connected to receive a POL1 1B signal. As will be seen, the POL1 1B signal indicates, when active (low), that cache write policy '11' has been selected by the user. Cache policy '11' forces a write-through for all CPU writes to memory. The output of NAND gate 70 forms a DIRTYB signal, and is also inverted by an invertor 70A to form a DRTYI signal and by an invertor 70B to form a DIRTY signal. DIRTYB, DIRTY and DRTYI indicate to other circuitry within the MCC 213, such as DRAM control module 12, that a dirty condition has occurred. Thus, when cache write policy '11' is selected, NAND gate 70 will always force such circuitry to believe that the dirty bit currently being read from dirty bit RAM 224B is low, indicating that the data currently being addressed in cache data RAM 224C is not stale. Accordingly, for example, MCC 213 will not copy the data out to DRAM before overwriting it in response to a cache read miss. NAND gate 70 permits the user to omit dirty bit RAM 224B entirely if it is known that write policy '11' will be used.

The select input of multiplexer 68 is connected to the output of a NAND gate 66, one input of which is connected to receive WT and the other input of which is connected to the output of a NOR gate 64. The two inputs of NOR gate 64 are connected to receive the CACM0 and CACM1 signals.

In normal operation, in cache mode '00' and WT=0, NAND gate 66 will output a logic 1 and multiplexer 68 will select the Z output of multiplexer 62 as the normal DRTYO value for writing to dirty bit RAM 224B. Only in cache mode '00' when WT=1 will multiplexer 68 select the LDIRTY value for writing to dirty bit RAM 224B. It will be seen that in that case, the latch 76 operates to latch the prior data which is to be overwritten on a write to dirty bit RAM 224B. When DRTYWB is high, dirty bit RAM 224B drives a data signal onto its data output lead which appears in FIG. 6 as IDIRTY. Latch 76 is transparent when DRTYWB is high so this information passes through the latch 76 to the A input of multiplexer 68 as LDIRTY. Since the select input of multiplexer 68 is at logic 0, multiplexer 68 outputs the IDIRTY information on the DRTYO output. When DRTYWB goes low, latch 76 latches the IDIRTY information as LDIRTY. That information continues to be transmitted to the DIRTYO output which is now enabled onto the data input lead of dirty bit RAM 224B. Dirty bit RAM 224B also disables its data output lead when DRTYWB goes low. When DRTYWB returns high, dirty bit RAM 224B loads in the data on its data input lead and again enables its data output lead. But since the data on the data input lead is that which was latched by latch 76, it can be seen that on a normal write to cache with caching enabled but with WT asserted, dirty bit RAM 224B will cache in the same value which was stored at the present address location prior to the cache write.

Figure 7:
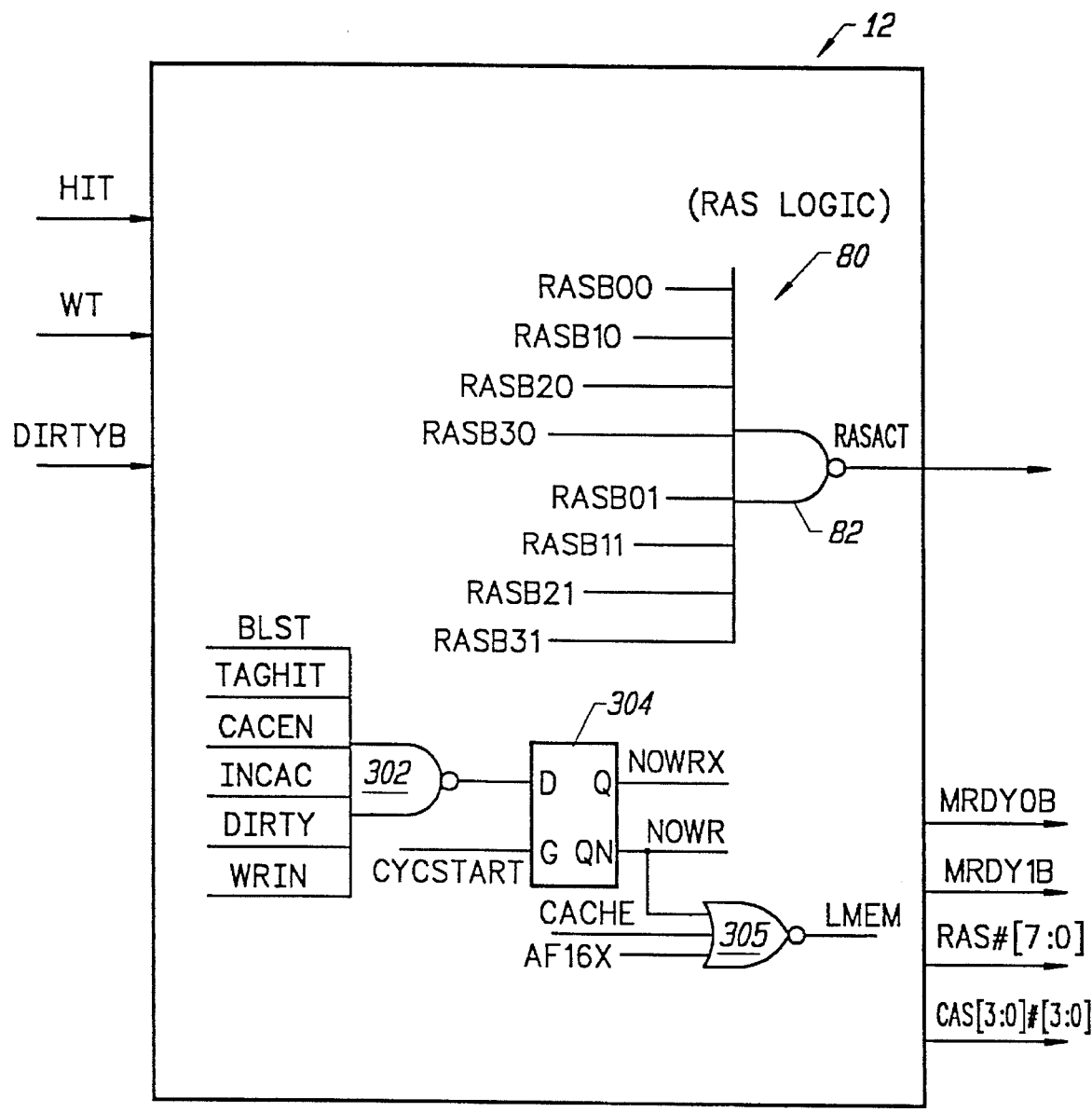
FIG. 7 is a schematic of the DRAM control module shown in FIG. 2.

FIG. 7 is a schematic diagram of relevant portions of the DRAM control module 12 shown in FIG. 3. In addition to generating RASACT, the DRAM control module 12 also generates the RAS#(7:0) row address strobes for the various banks of DRAM, and the CASx#(3:0) column address strobes for the byte lanes 3–0 of DRAM bank x. The RAS#(7:0) signals (individually called RASBxy) are all NANDed together by a NAND gate 82 to generate the RASACT signal output of DRAM control module 12. RASACT therefore will be active whenever any of the RASBxy signals are active. The circuitry which generates the RASBxy signals is not shown in FIG. 7 since it does not include any features specifically for implementing the invention.

DRAM control module 12 also contains the circuitry (not shown) which performs a copy-back function prior to a line fill on a cache read miss when the dirty bit is asserted. It uses the HIT and DIRTYB input signals to determine whether a copy-back is necessary, and contains no circuitry specifically for implementing the invention. As previously explained, however, the DIRTYB signal is altered in certain situations before it is provided to DRAM control module 12. In particular, DRAM control module 12 will "think" that no dirty condition has occurred when the MCC 213 is programmed for write policy '11' (pure write-through). In this situation, DRAM control module 12 will inhibit any copy-back regardless of whether the actual dirty bit stored in dirty bit RAM 224B is high or low. DRAM control module 12 also generates the two ready signals MRDYOB and MRDYIB for BRDY# logic 18 (FIG. 2). The circuitry (not shown) to generate MRDYOB and MRDY 1B contains nothing specifically for implementing the invention. It will be appreciated, however, that when WT is asserted on a CPU write to memory, RDYOB and RRDY1B from cache control module 10 are inhibited as previously described and BRDY# logic 18 responds only to MRDYOB or MRDYI B from DRAM control module 12. Accordingly, when a write-through to DRAM is forced in the MCC 213 in a situation which previously would have ended with a write to cache and a setting of the dirty bit, the BRDYB signal generated by BRDY# logic 18 is effectively delayed (if necessary) until the DRAM control module 12 completes its work. For writes to the memory subsystem when there is a DRAM page hit, the DRAM is just as fast as the cache. In this situation, therefore, deferring to the DRAM control module to provide the ready in fact imposes no delay at all.

DRAM control module 12 also includes circuitry described hereinafter for generating an internal LMEM signal. The DRAM control module 12 also includes other circuitry which is not important for an understanding of the invention and is therefore not shown.

Figure 8:
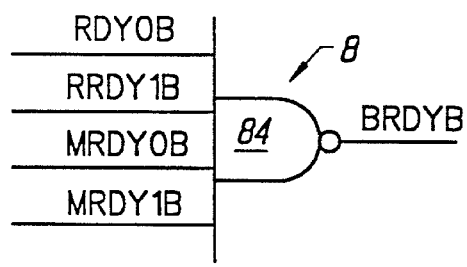
FIG. 8 is a schematic of BRDY#logic shown in FIG. 2.

FIG. 8 is a schematic of the BRDY# logic 18 shown in FIG. 3. The BRDYB output signal, which is provided to the BRDY# pin of MCC 213, is asserted to the CPU to indicate completion of a CPU cycle. The BRDY# logic 18 includes an AND gate 84 whose output is the BRDYB signal. The inputs of the AND gate 84 are signals RDYOB, RRDY1B, MRDYOB, and MRDY1B—if any of these input signals are active (low), then AND gate 84 will also activate BRDYB to indicate completion of the cycle.

Figure 9:
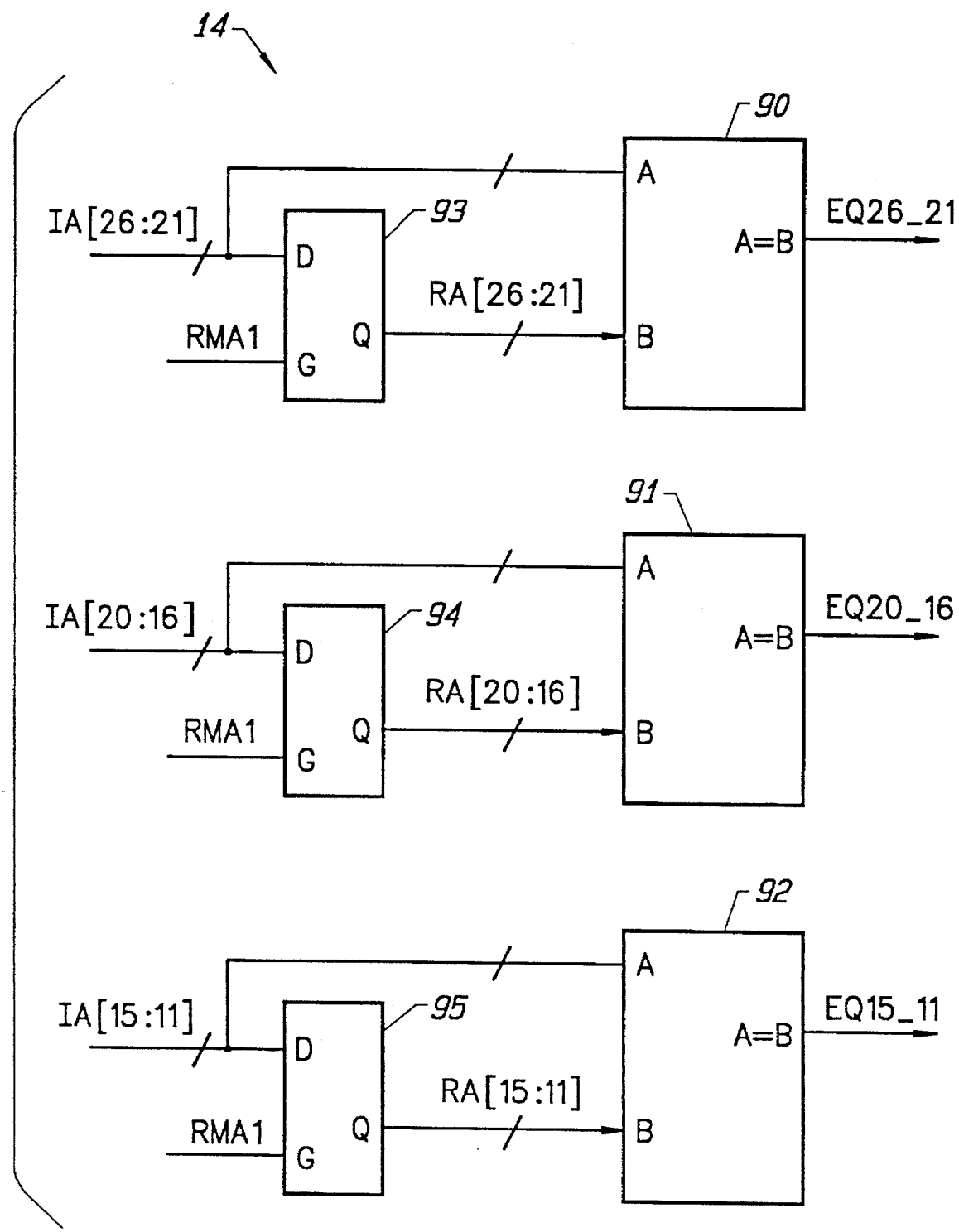
FIG. 9 is a schematic of page comparison logic shown in FIG. 2.

FIG. 9 illustrates the page comparison logic 14 shown in FIG. 2. The page comparison logic 14 functions to determine if a page hit condition has occurred. It includes three A=B comparators 90, 91, 92 and three respective latches 93, 94, 95. Following conventional designs, the information on CPU address lines IA[26:11] are provided to the Q input of latch 93 and input A of comparator 90. The Q output of latch 93 is provided to input B of comparator 90 over lines RA[26:11]. The active high enable input of latch 93 is connected to receive an RMA1 signal which carries an active high pulse on each DRAM access at a time when the memory address is valid on the CPU address lines. Accordingly, latch 93 always contains bits 26:11 of the page address most recently provided to the DRAM by MCC 213. Comparator 90 compares that information to bits 26:11 of the current page address to activate an EQ26_21 signal when the two are equal.

Similarly, CPU address lines IA[20:16] are connected to the D input of latch 94 and also to the A input of comparator 91. The Q output of latch is connected to the B input of comparator 91, which generates an EQ20$_{-16}$ output signal on its A=B output. Further, CPU address lines IA[15:11] are connected to the D input of latch 95 and also to the A input of comparator 92. The Q output of latch 95 is connected to the B input of comparator 92, which generates an EQ15$_{-11}$ signal on its A=B output. The active high enable inputs of latches 94 and 95 are connected to receive the same RMA1 signal which is provided to the enable input of latch 93. All of the signals EQ26_21, EQ20$_{-16}$ and EQ15$_{-11}$ must be asserted to indicate that the current page address matches the last page address.

The write policy selection register 16 illustrated in FIG. 2 is directly writable in the I/O address space in a conventional manner. The two output signals of the register 16, WPLCY0 and WPLCY1, are coupled to the adaptive logic 20 and determine the write policy to be used by the subject chipset. The write policies are defined as follows:

| (WPLCY1, WPLCY0) | Write Policy |
| --- | --- |
| 00 | Always use write-back method. |
| 01 | Write-through in case of page hit with RAS# active and no refresh pending, else write-back |
| 10 | Write-through in case of RAS# inactive and no refresh pending, and in case of page hit with RAS# active and no refresh pending; else write-back. |
| 11 | Always write-through. |

When policy '00' (pure write-back) is selected, the following procedures take place for reads and writes to memory, initiated by the CPU or by an EISA/ISA/DMA Master, on cache hits or misses, when the Dirty bit is asserted or negated. These procedures are conventional for writeback cache implementations.

Cache-Read-Hit, initiated by CPU. The cache memory provides data to the CPU. The MCC follows the CPU's burst protocol in order to fill the processor's internal cache line.

Cache-Read-Hit, initiated by EISA/ISA/DMA Master. The cache memory provides the requested data.

Cache-Read-Miss (Dirty bit negated), initiated by CPU. The data is provided by the DRAM. The MCC 213 does not need to update DRAM with the cache's current data because that data is unmodified. The cache controller asserts the write enable for cache tag RAM (TAGWE#), causing the cache tag RAM 224A to update its address information, and asserts the write enable for cache data RAM (CAWE#), causing the cache data RAM to store the new information as it is read from DRAM. This new data is presented to the CPU 212 (following burst protocol for 486 systems).

Cache-Read-Miss (Dirty bit negated), initiated by EISA/ISA/DMA Master. DRAM provides the data, the cache is bypassed.

Cache-Read-Miss (Dirty bit asserted), initiated by CPU. The cache controller first performs a copy-back function, updating DRAM memory with data from the cache location that is going to be overwritten. The controller writes the 16-byte line from cache memory to the DRAM, then reads the new line from DRAM into cache memory and de-asserts the DIRTY bit. The MCC asserts TAGWE#, CAWE#[3:0] and the dirty bit write enable signal (DIRTYWE#).

Cache-Read-Miss (Dirty bit asserted), initiated by EISA/ISA/DMA Master. DRAM provides the data, the cache is bypassed.

Cache-Write-Hit, initiated by CPU. Because a write-back policy is selected, the cache controller does not need to update the slower DRAM memory. Instead, the controller updates the cache memory and sets the DIRTY bit. (DIRTY may already be set, but that does not affect this cycle).

Cache-Write-Hit, initiated by EISA/ISA/DMA Master. Data is written to both the cache and DRAM. EADS# is asserted to the 486 CPU 212 to invalidate its internal cache line in order to maintain cache coherency. The dirty bit is unchanged.

Cache-Write-Miss, initiated by CPU or by EISA/ISA/DMA Master. The cache controller bypasses the cache entirely and writes the line directly into DRAM. DIRTY is unchanged.

When policy '11' (pure write-through) is selected, the following procedures take place for reads and writes to memory. These procedures are conventional for write-through cache implementations.

Cache-Read-Hit, initiated by CPU. The cache memory provides data to the CPU. The MCC follows the CPU's burst protocol in order fill the processor's internal cache line.

Cache-Read-Hit, initiated by EISA/ISA/DMA Master. The cache memory provides the requested data.

Cache-Read-Miss (Dirty bit ignored), initiated by CPU. The data is provided by the DRAM. The MCC 213 does not need to update DRAM with the cache's current data because that data always matches the corresponding data in DRAM. The cache controller asserts the write enable for cache tag RAM (TAGWE#), causing the cache tag RAM 224A to update its address information, and asserts the write enable for cache data RAM (CAWE#), causing the cache data RAM to store new information from memory as it is read from DRAM. This new data is presented to the CPU 212 (following burst protocol for 486 systems).

Cache-Read-Miss (Dirty bit ignored), initiated by EISA/ISA/DMA Master. DRAM provides the data, the cache is bypassed. In an alternative implementation, the cache may provide the data and the DRAM bypassed, since the data in both memories match.

Cache-Write-Hit, initiated by CPU. Because a write-through policy is selected, the cache controller writes the new data through to both cache and DRAM. The DIRTY bit remains unchanged.

Cache-Write-Hit, initiated by EISA/ISA/DMA Master. Data is written to both the cache and DRAM. EADS# is asserted to the 486 CPU 212 to invalidate its internal cache line in order to maintain cache coherency. The dirty bit is unchanged.

Cache-Write-Miss, initiated by CPU or by EISA/ISA/DMA Master. The cache controller bypasses the cache entirely and writes the line directly into DRAM. DIRTY is unchanged.

In accordance with the present invention, it has been determined that under certain conditions, on a CPU write to memory where there is a cache hit, it is just as fast to write the information through to both the cache and the DRAM at the same time. In particular, where there is a page hit (the current page address matches the previous page address) and the RAS# signal for the appropriate bank of DRAM is still active and no hidden refresh of local DRAM is pending, then it is just as fast to write the information through to cache and DRAM at the same time. In such a situation it is advantageous to do so since a copy-back function may later be avoided on a subsequent cache read miss which requires a line fill. Accordingly, if write policy '01' is selected, then on a cache write hit initiated by the CPU, if a page hit is detected and the RAS# line is still active and no hidden refresh of local DRAM is pending, the cache controller will write the new data to cache and leave the dirty bit unchanged, and the DRAM controller will write the new data through to DRAM. Stated another way, in this one situation, a "write-through" policy is forced. In all other situations, the procedures set forth above for the conventional write-back policy are followed. The dirty bit is left unchanged in this situation rather than cleared since it may have been asserted in a previous write to a different word of the same line of cache. If the dirty bit is now simply cleared, there will no longer be a record that part of the cache data line has dirty data. If writes to the memory subsystem have the same width as a line of cache, then it would suffice to simply clear the dirty bit in this situation. It would suffice to simply clear the dirty bit also where a cache line is wider than writes to the memory subsystem, if it could be determined in advance that additional writes will be performed to overwrite the entire line.

It has also been determined that under certain other conditions, a write-through to DRAM is neither as fast as a write only to cache nor as slow as a page miss write to DRAM. In particular, this would occur where the RAS# signal is no longer active from the previous DRAM access, (whether or not it was to the same page) and no hidden refresh of local DRAM is pending. Such an access is slower than a page hit with RAS# active, since the system must wait for the appropriate RAS# signal to settle in its asserted state before it can activate the CAS# signals to write data to memory. It is faster than a complete page miss, however, which must also wait for a RAS# signal to settle in its unasserted state after being deactivated before a new RAS# signal can be activated to load in the new row address. RAS# will be inactive only after a refresh of the DRAM or after any DMA, EISA or ISA access to DRAM.

In the RAS# inactive Case, it may or may not be advantageous to follow the write-through policy on a CPU write to memory in which a cache hit occurs. The relative timing will depend on the particular program being executed on the computer system. In order to provide for this option, write policy '10' will force a write-through to both cache and DRAM on a cache write hit initiated by the CPU, whenever the RAS# signals are inactive and no hidden refresh of local DRAM is pending. It will also force the write-through policy in the same situation as write policy '01'. The dirty bit remains unchanged in case it was asserted in a write to cache only, at a different position in the same cache data line.

Hidden refresh is described in U.S. patent application Ser. No. 07/885,430, filed May 18, 1992, entitled HIDDEN REFRESH WITH ROTATING ARBITRATION PRIORITY, by inventor Dipankar Bhattacharya, assigned to the assignee of the present invention and incorporated by reference herein. Basically, as it relates to the present invention, if a hidden refresh is pending, the MCC 213 will delay the next DRAM access until a refresh can take place. Thus in that situation, a write to DRAM may take longer than the write to cache alone even on a DRAM page hit. In an embodiment which does not implement a hidden refresh function, or which implements such a function in a different manner, it may not be necessary to test for refresh pending.

When a write-through to DRAM is indicated, it is accomplished in the system of FIG. 1 by latching the write data and generating BRDY# to the CPU in the first T2 (33 MHz CLK) or second T2 (50 MHz CLK). The MCC 213 then asserts CAS# in the next CLK cycle and de-asserts it in the following CLK cycle, both in the background. Meanwhile, the CPU can start a subsequent bus cycle by asserting ADS# in the same CLK cycle that MCC 213 asserts CAS#. In the one situation where the subsequent CPU bus cycle is a cache read miss page hit, although CAS# could otherwise be asserted in the first CLK cycle after ADS#, the system of FIG. 1. must delay it by one CLK cycle since CAS# is still active from the previous CPU write-through cycle. That penalty does not exist if the subsequent bus cycle is any other cycle type, since all the other cycle types do not need to assert CAS# while the background CAS# is still asserted from the previous write-through DRAM access.

In the adaptive write-back modes (write policies '01' or '10'), when a write-back policy is indicated for a cache write hit, the MCC 213 will write the data to cache only and set the corresponding dirty bit as explained above. Similarly, when a write-through policy is indicated for a cache write hit, the dirty bit is ignored and the information is written through to both cache and DRAM. The latter write-through operation will create the one-CLK delay referred to above if the next memory access is a cache read miss page hit. If the cache line is already marked for write-back, i.e. the dirty bit is already set from a previous cache write hit to the same or another word in the line when the write-back policy was indicated, then it may be advantageous not to write through to DRAM on the cache write hit even where there is a page hit with RAS# active. Accordingly, the MCC 213, on a cache write hit with dirty asserted, overrides WT and stops the generation of CAS# for write-through to DRAM. The data is written only to cache and the dirty bit is left unchanged.

The circuitry to override WT and stop the generation of CAS# is shown in FIG. 7. In particular, the DRAM control module 12 includes a six-input NAND gate 302, connected to receive a BLST signal, a TAGHIT signal, a CACEN signal, INCAB, DIRTY, and a WRIN signal. BLST is derived from the CPU bus BLAST# signal; TAGHIT is derived from CCHITB and indicates a cache hit; CACEN is derived from a configuration register bit and indicates that cacheing is enabled; and WRIN follows the signal on the W/R# pin and indicates a write access. NAND gate 302 will output a logic 0 only when there is a cache write hit with DIRTY asserted.

The output of NAND gate 302 is connected to the D input of a transparent latch 304, the enable input of which is connected to receive a CYCSTART signal. CYCSTART is internal to the DRAM control module 12 and is active for the first T2 cycle in any DRAM cycle.

The inverting output of latch 304 is connected to one input of a three-input NOR gate 306, the other two inputs of which are connected to receive a CACHE signal and an AF16x signal. The output of NOR gate 306 forms an LMEM signal.

In operation, the DRAM state machine (not shown) which generates the RAS# and CAS# signals samples LMEM before doing so. If LMEM is low, the DRAM state machine assumes that a device other than the DRAM controller 12 will be handling the cycle. It therefore aborts the generation of DRAM control signals. In the circuitry of FIG. 7, LMEM will be low whenever any one of the signals CACHE, AF16x or NOWR is high. NOWR will go high when the output of NAND gate 302 goes high, which occurs on a cache write hit with the dirty bit asserted. Thus, in that situation, the circuitry of FIG. 7 effectively causes the DRAM state machine to "think" that another device will be handling the cycle. The DRAM state machine therefore aborts the DRAM write. The DRAM state machine itself includes no circuitry specifically for implementing the invention.

Figure 10:
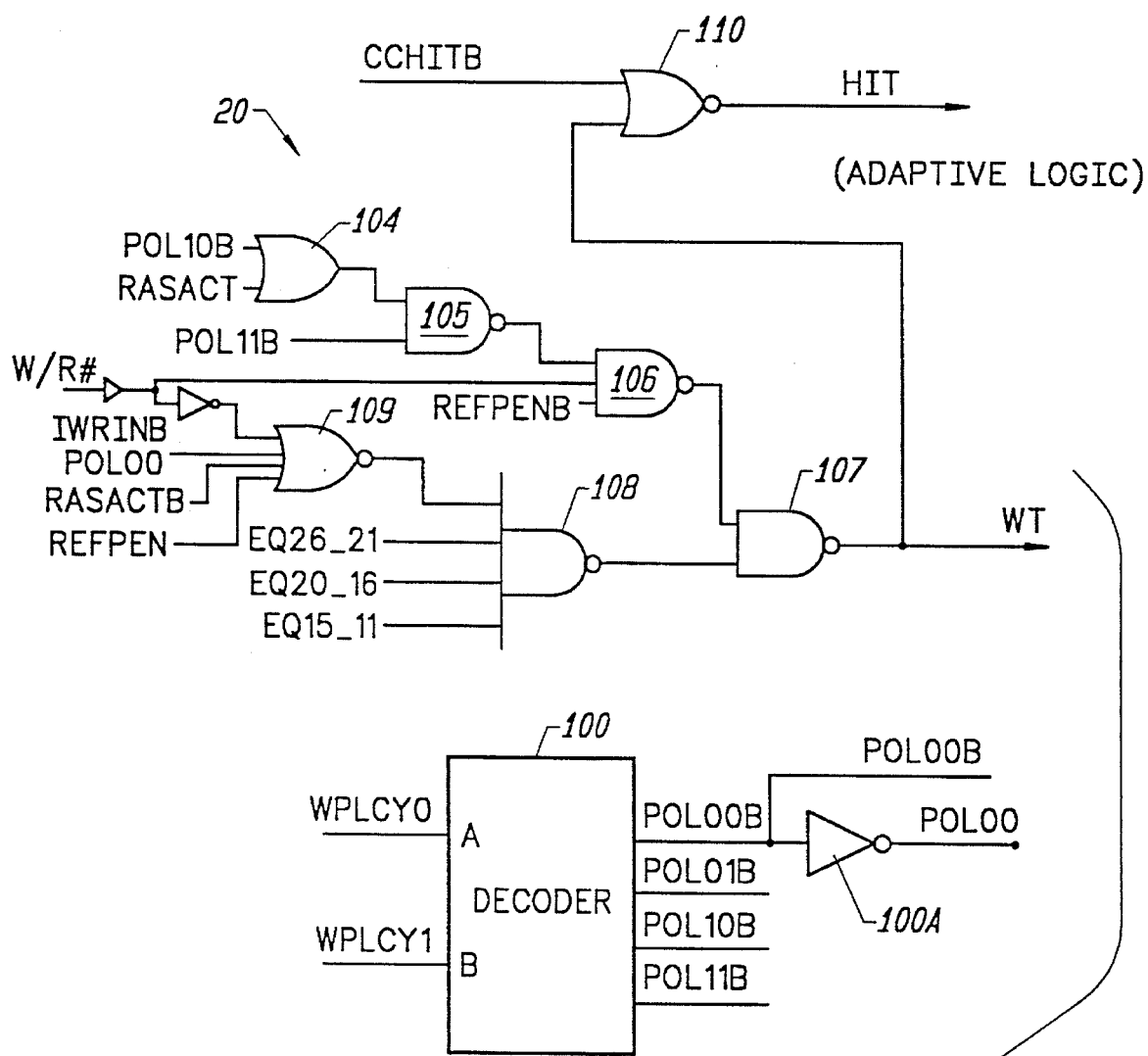
FIG. 10 is a schematic of adaptive logic shown in FIG. 2.

Turning now to the adaptive logic shown in FIG. 10, the main purpose of the adaptive logic 10 is to determine when to properly generate a WT signal for the purpose of the invention. The write policy selection bits (WPLCY0, WPLCY1) are provided to a decoder 100 that outputs a low signal on the corresponding write policy line (POL00B, POL01B, POL10B, POL11B). POL00B is further inverted by an invertor 100A to generate POL00. The RASACT and POL10B (adaptive write-back selection option '10') signals are connected to respective inputs of an OR gate 104, the output of which is connected to one input of a NAND gate 105. The other input of NAND gate 105 is connected to receive POL11B, and the output is connected to one input of a three-input NAND gate 106. The second input of NAND gate 106 is connected to an IWRIN signal, which is coupled via a buffer to receive the signal on the MCC 213 W/R# pin. The third input of NAND gate 106 is connected to receive a REFPENB signal, which is asserted low to indicate that a local DRAM refresh is pending. REFPENB is equivalent to the MCCRDY signal of the above-identified HIDDEN REFRESH WITH ROTATING ARBITRATION PRIORITY application, as synchronized with the host bus CLK signal. The output of NAND gate 106 is connected to one input of another NAND gate 107, the other input of which is connected to the output of a four-input NAND gate 108. The four inputs of NAND gate 1.08 are connected to receive the $EQ15_{13}\_11$ signal, the $EQ20\_16$ signal and the $EQ26\__{21}$ signal from page comparison logic 14, as well as the output of a four-input NOR gate 109. One input of NOR gate 109 is connected to receive an IWRINB signal, which is inverted from IWRIN. A second input of NOR gate 109 is connected to receive REFPEN (the complement of REFPENB), and the other two inputs of NOR gate 109 are connected to receive RASACTB (the inverse of RASACT from DRAM control module 12) and POL00, respectively. The output of NAND gate 107 forms the WT signal provided to cache control module 10 and DRAM control module 12. WT is also connected to one input of a NOR gate 110, the other input of which is connected to receive CCHITB from cache control module 10. The output of NOR gate 110 provides the HIT signal to DRAM control module 12.

In operation, it can be seen first that when write policy '11' is selected (pure write-through), POL11B will be low and NAND gate 105 will output a logic 1. When a write occurs (IWRIN goes high), NAND gate 106 will output a logic 0, forcing WT high and asserted. Accordingly, in write policy '11', every write access to memory will activate WT.

If write policy '01' is selected (write-through only on cache write miss page hit, RAS# active, no refresh pending), then both inputs to NAND gate 105 will be high. The output of NAND gate 105 will therefore be low, forcing the output of NAND gate 106 high and permitting NAND gate 107 to pass, inverted, whatever the output of NAND gate 108. The output of NAND gate 108 will be low only if all of the inputs $EQ26\_21$, $EQ20\_16$ and $EQ15\_11$ are asserted, which is true only on a page hit. It also requires the output of NOR gate 109 to be high, which occurs only when all of its inputs are low. Accordingly, NAND gate 108 will output a logic 0 only when there is a page hit, RASACTB is low (asserted), REFPEN is low, and W/R# is high (indicating a write access). The output of NAND gate 108 is passed through to the output of NAND gate 107 inverted, thereby asserting WT only on write accesses with a page hit and RAS# active with no refresh pending.

If write policy '10' is selected (write-through on cache write hit, RAS# inactive, and on cache write hit page hit, RAS# active), WT will continue to be asserted via the logic 0 output of NAND gate 108 when there is a page hit with RAS# active and no refresh pending. In addition, however, if RAS# is inactive, both inputs of OR gate 104 will be low and the output of NAND gate 105 will be forced high. When the write access occurs (W/R#=1), assuming REFPENB=1 (unasserted), the output of NAND gate 106 will go low, thereby forcing WT asserted. Accordingly, in this situation, WT will be asserted either on a page hit with RAS# active and no refresh pending, or when RAS# is inactive and no refresh is pending (regardless whether there is a page hit).

If write policy '00' is selected (pure write-back), the circuitry of FIG. 6 never asserts WT. This can be seen because in write policy '00', both inputs of NAND gate 105 will be high. This forces the output of NAND gate 105 low, thereby forcing the output of NAND gate 106 high. Since POL00 is high, NOR gate 109 will output a logic 0, thereby forcing the output of NAND gate 108 high. Since both inputs of NAND gate 107 are high, WT will remain unasserted (low).

It can further-be seen in FIG. 10 that the CCHITB signal (the complement of CCHIT) from cache control module 10 is NORed by NOR gate 110 with the WT signal to generate the HIT signal for DRAM control module 12. Thus the DRAM control module 12 will "think" that a cache miss has occurred whenever the cache control module 10 indicates a cache miss via CCHITB, and also whenever WT is asserted whether or not a cache miss has truly occurred.

Figure 5:
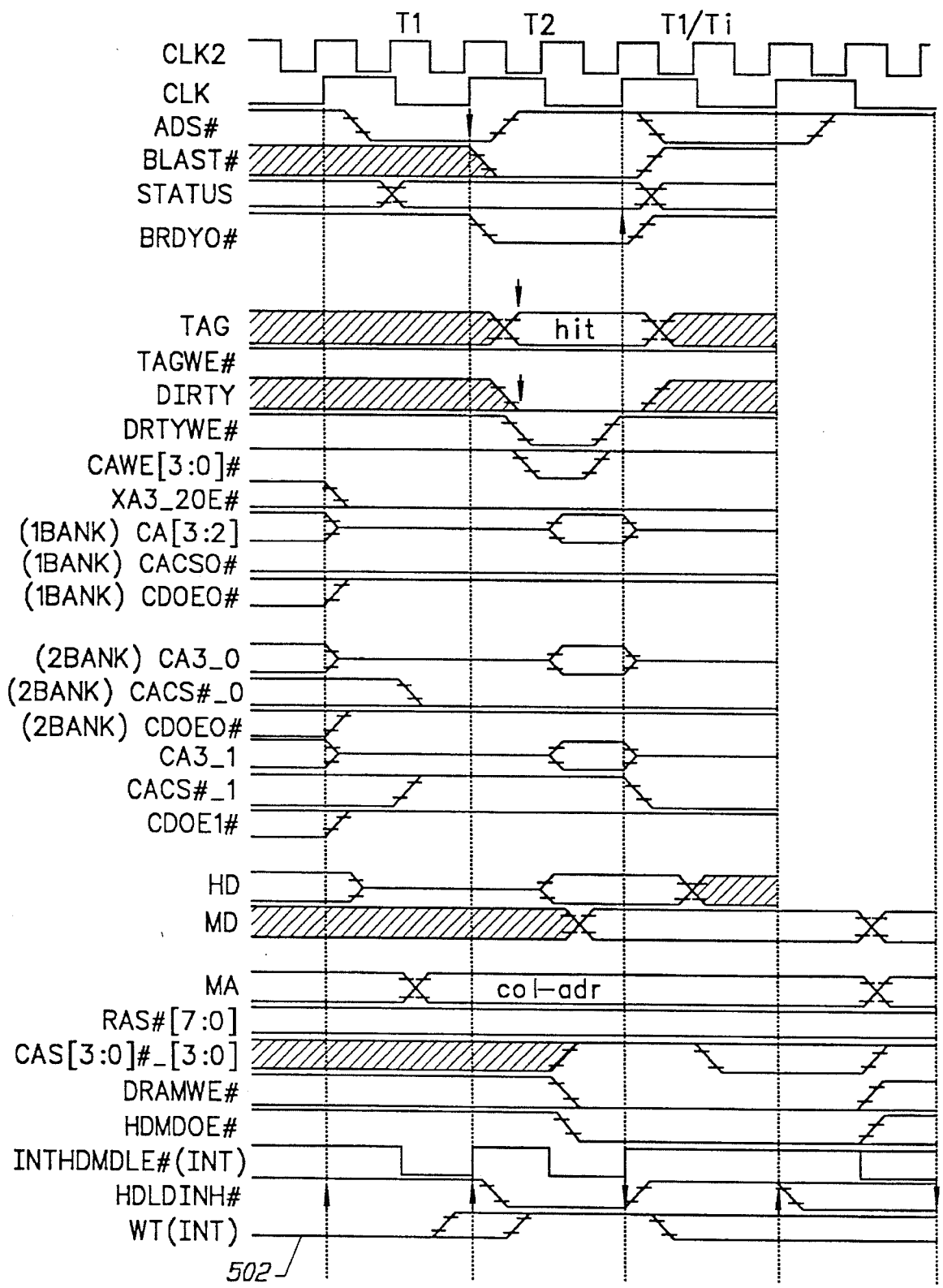
FIG. 5 is a waveform diagram of sample signals which may be generated during the operation of the invention.

FIG. 5 is a waveform diagram example showing the relevant external MCC and host bus signals generated for the situation where an adaptive write-back write policy has been selected, and a cache write hit page hit, dirty bit negated, has occurred. The internal WT signal is shown as waveform 502.

The invention has been described with respect to particular embodiments thereof and it will be understood that numerous variations are possible within its scope.

We claim:

1. A method for writing data to a memory subsystem on a cache hit write access, said memory subsystem including a cache memory, a page mode DRAM memory and memory subsystem control apparatus, comprising the steps of:

writing said data to said cache memory;

determining whether said cache hit write access is also a DRAM page hit write access;

writing said data through to said DRAM memory only if said cache hit write access is also a DRAM page hit write access; and flagging a dirty condition in said cache memory if said cache hit write access is not also a DRAM page hit write access.

2. A method according to claim 1, wherein said memory subsystem is such that on a cache read miss with a dirty condition flagged, information from said cache memory is written to said main memory before said cache read miss operation can be satisfied.

3. A method for writing data to a memory subsystem on a cache hit write access, said memory subsystem including a cache memory, a page mode DRAM memory and memory subsystem control apparatus, said DRAM memory having a row address strobe (RAS#) input coupled to receive a RAS# signal provided by said memory subsystem control apparatus, comprising the steps of:

writing said data to said cache memory;

determining whether said cache hit write access is also a DRAM page hit write access;

determining whether said RAS# signal is active;

writing said data through to said DRAM memory only if said cache hit write access is also a DRAM page hit write access and said RAS# signal is active;

flagging a dirty condition in said cache memory if said cache hit write access is not also a DRAM page hit write access; and flagging a dirty condition in said cache memory also if said RAS# signal is inactive.

4. A method for writing data to a memory subsystem on a cache hit write access, said memory subsystem including a cache memory, a page mode DRAM memory and memory subsystem control apparatus, said DRAM memory having a row address strobe (RAS#) input coupled to receive a RAS# signal provided by said memory subsystem control apparatus, comprising the steps of:

writing said data to said cache memory;

determining whether said cache hit write access is also a DRAM page hit write access;

determining whether said RAS# signal is active;

determining whether a refresh of said DRAM is pending;

writing said data through to said DRAM memory only if said cache hit write access is also a DRAM page hit write access, said RAS# signal is active, and no refresh of said DRAM is pending;

flagging a dirty condition in said cache memory if said cache hit write access is not also a DRAM page hit write access;

flagging a dirty condition in said cache memory also if said RAS# signal is inactive; and flagging a dirty condition in said cache memory also if a refresh of said DRAM is pending.

5. A method for writing data to a memory subsystem on a cache hit write access, said memory subsystem including a cache memory, a page mode DRAM memory and memory subsystem control apparatus, said DRAM memory having a row address strobe (RAS#) input coupled to receive a RAS# signal provided by said memory subsystem control apparatus, comprising the steps of:

writing said data to said cache memory;

determining whether said cache hit write access is also a DRAM page hit write access;

determining whether said RAS# signal is active;

writing said data through to said DRAM memory if said cache hit write access is also a DRAM page hit write access;

writing said data through to said DRAM memory also if said RAS# signal is inactive; and flagging a dirty condition in said cache memory only if said cache hit write access is not a DRAM page hit write access and said RAS# signal is active.

6. A method for writing data to a memory subsystem on a cache hit write access, said memory subsystem including a cache memory, a page mode DRAM memory and memory subsystem control apparatus, said DRAM memory having a row address strobe (RAS#) input coupled to receive a RAS# signal provided by said memory subsystem control apparatus, comprising the steps of:

writing said data to said cache memory;

determining whether said cache hit write access is also a DRAM page hit write access;

determining whether said RAS# signal is active;

determining whether a refresh of said DRAM is pending;

writing said data through to said DRAM memory if said cache hit write access is also a DRAM page hit write access and no refresh of said DRAM is pending;

writing said data through to said DRAM memory also if said RAS# signal is inactive and no refresh of said DRAM is pending;

flagging a dirty condition in said cache memory if said cache hit write access is not a DRAM page hit write access and said RAS#signal is active; and flagging a dirty condition in said cache memory also if a refresh of said DRAM is pending.

7. Memory management apparatus for use with a memory subsystem having a cache memory and a page mode DRAM memory, for use in response to a cache hit data write access, comprising:

means for writing said data to said cache memory;

first determining means for determining whether said cache hit write access is also a DRAM page hit write access;

means, responsive to said first determining means, for writing said data through to said DRAMmemory only if said cache hit write access is also a DRAM page hit write access; and means, responsive to said first determining means, for flagging a dirty condition in said cache memory if said cache hit write access is not also a DRAM page hit write access.

8. Memory management apparatus for use with a memory subsystem having a cache memory and a page mode DRAM memory, said DRAM memory having a row address strobe (RAS#) input coupled to receive a RAS# signal provided by said memory management apparatus, for use in response to a cache hit data write access, comprising:

means for writing said data to said cache memory;

first determining means for determining whether said cache hit write access is also a DRAM page hit write access;

second determining means for determining whether said

RAS# signal is active;

means, responsive to said first and second determining means, for writing said data through to said DRAM memory only if said cache hit write access is also a DRAM page hit write access and said RAS# signal is active;

means, responsive to said first determining means, for flagging a dirty condition in said cache memory if said cache hit write access is not also a DRAM page hit write access; and means, responsive to said second determining means, for flagging a dirty condition in said cache memory also if said RAS# signal is inactive.

9. Memory management apparatus for use with a memory subsystem having a cache memory and a page mode DRAM memory, said DRAM memory having a row address strobe (RAS#) input coupled to receive a RAS# signal provided by said memory management apparatus, comprising:

means for writing said data to said cache memory;

first determining means for determining whether said cache hit write access is also a DRAM page hit write access;

second determining means for determining whether said RAS# signal is active;

third determining means for determining whether a refresh of said DRAM is pending;

means, responsive to said first, second and third determining means, for writing said data through to said DRAM memory only if said cache hit write access is also a DRAM page hit write access, said RAS# signal is active, and no refresh of said DRAM is pending;

means, responsive to said first determining means, for flagging a dirty condition in said cache memory if said cache hit write access is not also a DRAM page hit write access;

means, responsive to said second determining means, for flagging a dirty condition in said cache memory also if said RAS# signal is inactive; and means, responsive to said third determining means, for flagging a dirty condition in said cache memory also if a refresh of said DRAM is pending.

10. Memory management apparatus for use with a memory subsystem having a cache memory and a page mode DRAM memory, said DRAM memory having a row address strobe (RAS#) input coupled to receive a RAS# signal provided by said memory management apparatus, for use in response to a cache hit data write access, comprising:

means for writing said data to said cache memory;

first determining means for determining whether said cache hit write access is also a DRAM page hit write access;

second determining means for determining whether said RAS# signal is active;

means, responsive to said first determining means, for writing said data through to said DRAM memory if said cache hit write access is also a DRAM page hit write access;

means, responsive to said second determining means, for writing said data through to said DRAM memory also if said RAS# signal is inactive; and means for flagging a dirty condition in said cache memory only if said cache hit write access is not a DRAM page hit write access and said RAS# signal is active.

11. Memory management apparatus for use with a memory having a cache memory and a page mode DRAM memory, said DRAM memory having a row address strobe (RAS#) input coupled to receive a RAS# signal provided by said memory management apparatus, for use in response to a cache hit write data access, comprising:

means for writing said data to said cache memory;

first determining means for determining whether said cache hit write access is also a DRAM page hit write access;

second determining means for determining whether said RAg# signal is active;

third determining means for determining whether a refresh of said DRAM is pending;

means, responsive to said first and third determining means, for writing said data through to said DRAM-memory if said cache hit write access is also a DRAM-page hit write access and no refresh of said DRAM is pending;

means, responsive to said second and third determining means, for writing said data through to said DRAM-memory also if said RAS# signal is inactive and no refresh of said DRAM is pending;

means, responsive to said first and second determining means, for flagging a dirty condition in said cache memory if said cache hit write access is not a DRAM page hit write access and said RAS# signal is active; and means, responsive to said third determining means, for flagging a dirty condition in said cache memory also if a refresh of said DRAM is pending.

* * * * *